United States Patent
Endoh et al.

(10) Patent No.: US 12,264,378 B2
(45) Date of Patent: *Apr. 1, 2025

(54) HIGH STRENGTH STEEL SHEET AND METHOD FOR MANUFACTURING THE SAME

(71) Applicant: JFE Steel Corporation, Tokyo (JP)

(72) Inventors: Kazuki Endoh, Tokyo (JP); Yoshiyasu Kawasaki, Tokyo (JP); Yuki Toji, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 422 days.

This patent is subject to a terminal disclaimer.

(21) Appl. No.: 17/770,336

(22) PCT Filed: Oct. 8, 2020

(86) PCT No.: PCT/JP2020/038198
§ 371 (c)(1),
(2) Date: Apr. 20, 2022

(87) PCT Pub. No.: WO2021/079756
PCT Pub. Date: Apr. 29, 2021

(65) Prior Publication Data
US 2022/0396847 A1    Dec. 15, 2022

(30) Foreign Application Priority Data
Oct. 23, 2019    (JP) .................. 2019-192516

(51) Int. Cl.
| | |
|---|---|
| C21D 9/46 | (2006.01) |
| B21C 47/02 | (2006.01) |
| B32B 15/01 | (2006.01) |
| C21D 8/02 | (2006.01) |
| C22C 38/00 | (2006.01) |
| C22C 38/02 | (2006.01) |
| C22C 38/04 | (2006.01) |
| C22C 38/06 | (2006.01) |
| C22C 38/08 | (2006.01) |
| C22C 38/12 | (2006.01) |
| C22C 38/16 | (2006.01) |
| C22C 38/38 | (2006.01) |
| C22C 38/60 | (2006.01) |
| C23C 2/06 | (2006.01) |
| C23C 2/28 | (2006.01) |
| C23C 2/40 | (2006.01) |

(52) U.S. Cl.
CPC ............... *C21D 9/46* (2013.01); *B21C 47/02* (2013.01); *C21D 8/0226* (2013.01); *C21D 8/0236* (2013.01); *C21D 8/0247* (2013.01); *C22C 38/002* (2013.01); *C22C 38/02* (2013.01); *C22C 38/04* (2013.01); *C22C 38/06* (2013.01); *C23C 2/06* (2013.01); *C23C 2/40* (2013.01); *C21D 2211/001* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| | | |
|---|---|---|
| 2014/0050941 A1 | 2/2014 | Kawaski et al. |
| 2018/0002800 A1 | 1/2018 | Hasegawa et al. |
| 2018/0057916 A1 | 3/2018 | Obata et al. |
| 2019/0106760 A1* | 4/2019 | Yamashita ........... C21D 8/0426 |
| 2019/0211427 A1 | 7/2019 | Sano et al. |
| 2020/0347471 A1 | 11/2020 | Zhu et al. |
| 2021/0010101 A1 | 1/2021 | Endo et al. |
| 2021/0017620 A1 | 1/2021 | Yokoyama et al. |
| 2021/0102278 A1 | 4/2021 | Hasegawa et al. |
| 2021/0115541 A1 | 4/2021 | Endo et al. |
| 2022/0267876 A1 | 8/2022 | Endoh et al. |

FOREIGN PATENT DOCUMENTS

| | | |
|---|---|---|
| CN | 107075627 A | 8/2017 |
| CN | 107429371 A | 12/2017 |
| CN | 108713066 A | 10/2018 |
| CN | 109072380 A | 12/2018 |
| EP | 3178956 A1 | 6/2017 |

(Continued)

OTHER PUBLICATIONS

Japanese Office Action for Japanese Application No. 2021-512457, dated Mar. 9, 2022, with Concise Statement of Relevance of Office Action, 6 pages.
Extended European Search Report for European Application No. 20878749.9, dated Jan. 3, 2023, 11 pages.
Office Action issued by the U.S. Patent and Trademark Office in the U.S. Appl. No. 17/770,116, mailed Aug. 28, 2024, U.S. Patent and Trademark Office, Alexandria, VA. (9 pages).
International Search Report and Written Opinion for International Application No. PCT/JP2020/038198, dated Dec. 28, 2020, 6 pages.

(Continued)

*Primary Examiner* — Anthony M Liang
(74) *Attorney, Agent, or Firm* — Buchanan Ingersoll & Rooney PC

(57) ABSTRACT

Provided is a high strength steel sheet that has a predetermined chemical composition and is manufactured under optimum conditions, the high strength steel sheet having a steel microstructure including, by area, ferrite: 30% or more and 80% or less, tempered martensite: 3.0% or more and 35% or less, and retained austenite: 8% or more, wherein the quotient of the area fraction of grains of the retained austenite, the grains having an aspect ratio of 2.0 or more and a minor axis length of 1 μm or less, divided by the total area fraction of the retained austenite is 0.3 or more, wherein the quotient of the average Mn content (mass %) in the retained austenite divided by the average Mn content (mass %) in the ferrite is 1.5 or more.

18 Claims, No Drawings

(56) References Cited

FOREIGN PATENT DOCUMENTS

| | | |
|---|---|---|
| EP | 3228722 A1 | 10/2017 |
| EP | 3279363 A1 | 2/2018 |
| EP | 3399066 A1 | 11/2018 |
| EP | 3447160 A1 | 2/2019 |
| EP | 3550050 A1 | 9/2019 |
| EP | 3712284 A1 | 9/2020 |
| JP | 61157625 A | 7/1986 |
| JP | 01259120 A | 10/1989 |
| JP | 2003138345 A | 5/2003 |
| JP | 2009256773 A | 11/2009 |
| JP | 6123966 B1 | 5/2017 |
| JP | 6338038 B1 | 6/2018 |
| KR | 20190105616 A | 9/2019 |
| WO | 2016132680 A1 | 8/2016 |
| WO | 2019111029 A1 | 6/2019 |
| WO | 2019111083 A1 | 6/2019 |
| WO | 2019111084 A1 | 6/2019 |
| WO | 2019159771 A1 | 8/2019 |
| WO | 2019187060 A1 | 10/2019 |
| WO | 2019188640 A1 | 10/2019 |
| WO | 2019188642 A1 | 10/2019 |

OTHER PUBLICATIONS

Korean Office Action for Korean Application No. 10-2022-7013339, dated Mar. 25, 2024 with Concise Statement of Relevance of Office Action, 8 pages.

Chinese Office Action with Search Report for Chinese Application No. 202080073477.6, dated Sep. 15, 2022, 11 pages.

Office Action issued by the U.S. Patent and Trademark Office in the U.S. Appl. No. 17/770,328, mailed Nov. 7, 2024, U.S. Patent and Trademark Office, Alexandria, VA. (14 pages).

Office Action issued by the U.S. Patent and Trademark Office in the U.S. Appl. No. 17/770,118, mailed Oct. 31, 2024, U.S. Patent and Trademark Office, Alexandria, VA. (15 pages).

* cited by examiner

HIGH STRENGTH STEEL SHEET AND METHOD FOR MANUFACTURING THE SAME

CROSS REFERENCE TO RELATED APPLICATIONS

This is the U.S. National Phase application of PCT/JP2020/038198, filed Oct. 8, 2020 which claims priority to Japanese Patent Application No. 2019-192516, filed Oct. 23, 2019, the disclosures of these applications being incorporated herein by reference in their entireties for all purposes.

FIELD OF THE INVENTION

The present invention relates to a high strength steel sheet having excellent formability which is suitably used as a member in various industries, such as the automotive industry and the electrical industry, and a method for manufacturing the high strength steel sheet. Specifically, aspects of the present invention attempt to produce a high strength steel sheet that has a high yield ratio (YR) of more than 0.70 and a TS (tensile strength) of 980 MPa or more and is excellent in terms of not only ductility but also stretch flangeability and bendability.

BACKGROUND OF THE INVENTION

Improving fuel economy of automobiles has been an important issue from the viewpoint of global environmental conservation. Accordingly, there have been active movements to increase the strengths of car body materials in order to allow reductions in the thicknesses of the car body materials and the weights of car bodies. Since increasing the strength of a steel sheet may degrade the formability of the steel sheet, the development of a material having both high strength and high formability has been anticipated. In the case where a steel sheet having a TS of 980 MPa or more is used as a vehicle frame member, the steel sheet is required to have high formability and a high YR (yield ratio) in order to protect vehicle occupants.

There has been proposed a high strength steel sheet that uses strain induced transformation of retained austenite, which has a high strength and excellent ductility. This steel sheet has a microstructure including retained austenite and can be readily formed into an intended shape due to retained austenite during forming, while the steel sheet comes to have a high strength subsequent to forming as a result of transformation of retained austenite to martensite.

For example, Patent Literature 1 proposes a high strength steel sheet having a tensile strength of 1000 MPa or more, a total elongation (EL) of 30% or more, and markedly high ductility, the steel sheet being manufactured using strain induced transformation of retained austenite. Such a steel sheet is manufactured by causing a steel sheet containing C, Si, and Mn as fundamental constituents to form austenite, subsequently quenching the steel sheet in the bainite transformation temperature range, and performing isothermal holding, that is, an austempering treatment. Retained austenite is formed as a result of C being concentrated at austenite due to the austempering treatment, and the formation of a large amount of retained austenite requires addition of a large amount of C exceeding 0.3%. However, an increase in the C concentration in steel degrades spot weldability, and in particular a C concentration exceeding 0.3% significantly degrades spot weldability. Thus, it has been difficult to bring this technique into active use for automotive steel sheets. In addition, no consideration is given to stretch flangeability and bendability in Patent Literature 1 because the main purpose is to improve the ductility of the high strength steel sheet.

In Patent Literature 2, a high Mn steel is used and a suitable strength-ductility balance is achieved by performing a heat treatment in the ferrite-austenite dual phase region. However, in Patent Literature 2, no study is performed on the improvement of ductility by concentrating Mn at untransformed austenite. Thus, there is a room for improving workability.

In Patent Literature 3, a medium Mn steel is used and total elongation is increased by performing a heat treatment in the ferrite-austenite dual phase region, concentrating Mn at untransformed austenite, and thereby forming stable retained austenite. However, it is considered that the concentration of Mn is not at the level enough to achieve the compatibility of the intended elongation, yield ratio, stretch flangeability, and bendability because the amount of time during which the heat treatment is performed is small and the diffusion rate of Mn is low.

Furthermore, in Patent Literature 4, a medium Mn steel is used and uniform elongation and stretch flangeability are improved by performing a heat treatment of a hot rolled steel sheet in the ferrite-austenite dual phase region for a long period of time, facilitating the concentration of Mn at untransformed austenite, and thereby forming retained austenite grains having a high aspect ratio. However, in Patent Literature 4, the improvement of the ductility and stretch flangeability of a high strength steel sheet only by Mn concentration is studied; no study is performed on the improvement of yield ratio and bendability by controlling the distribution of C and Mn in the second phase composed of retained austenite and martensite.

Patent Literature

PTL 1: Japanese Unexamined Patent Application Publication No. S61-157625
PTL 2: Japanese Unexamined Patent Application Publication No. H1-259120
PTL 3: Japanese Unexamined Patent Application Publication No. 2003-138345
PTL 4: Japanese Patent No. 6123966

SUMMARY OF THE INVENTION

Aspects of the present invention were made in light of the above-described circumstances. An object of aspects of the present invention is to provide a high strength steel sheet having a high yield ratio (YR) of more than 0.70, a TS (tensile strength) of 980 MPa or more, and excellent formability and a method for manufacturing the high strength steel sheet. Note that the term "formability" used herein refers to ductility, stretch flangeability, and bendability.

In order to achieve the above object, the inventors of the present invention conducted extensive studies in terms of the chemical composition of the steel sheet and a method for manufacturing the steel sheet and consequently found the following facts.

Specifically, the inventors of the present invention found that it is important to limit the Mn content to 2.50% by mass or more and 8.00% by mass or less, adjust the contents of the other alloying elements, such as Ti, to fall within adequate ranges, optionally perform holding at a temperature equal to or lower than the $Ac_1$ transformation temperature for more than 1800 s subsequent to hot rolling, then perform cold rolling, subsequently perform holding at a temperature equal to or higher than the $Ac_3$ transformation temperature −50° C. for 20 s or more and 1800 s or less, and then perform cooling to a cooling stop temperature equal to or lower than the martensitic transformation start temperature such that film-like austenite grains, which serve as cores of fine retained austenite grains having a high aspect ratio, are formed in the subsequent reheating step. After the cooling has been stopped, reheating is performed to a reheating temperature equal to or higher than the $Ac_1$ transformation temperature and equal to or lower than the $Ac_1$ transformation temperature +150° C., holding is subsequently performed at the reheating temperature for 20 or more and 1800 s or less, and then cooling is performed. Furthermore, as needed, a galvanizing treatment may be performed. Moreover, an alloying treatment may be further performed at 450° C. or more and 600° C. or less. Subsequently, cooling is performed to 100° C. or less, holding is then performed at more than 100° C. and 400° C. or less for 10 s or more, and then cooling is performed. It was found that the above-described method enables the production of a high strength steel sheet having excellent formability, the steel sheet having a steel microstructure including, by area, ferrite: 30% or more and 80% or less, tempered martensite: 3.0% or more and 35% or less, and retained austenite: 8% or more, wherein the quotient of the area fraction of grains of the retained austenite, the grains having an aspect ratio of 2.0 or more and a minor axis length of 1 μm or less, divided by the total area fraction of the retained austenite is 0.3 or more, wherein the quotient of the average Mn content (mass %) in the retained austenite divided by the average Mn content (mass %) in the ferrite is 1.5 or more, and the product of the quotient of the average Mn content (mass %) in the retained austenite divided by the average Mn content (mass %) in the ferrite and the average aspect ratio of the retained austenite is 3.0 or more, wherein the quotient of the average C content (mass %) in the retained austenite divided by the average C content (mass %) in the ferrite is 3.0 or more, wherein the quotient of the average C content (mass %) in the retained austenite divided by the average Mn content (mass %) in the retained austenite is less than 0.05, and wherein the content of diffusible hydrogen in steel is 0.3 ppm by mass or less.

Aspects of the present invention were made on the basis of the above-described findings. The summary of aspects of the present invention is as follows.

[1] A high strength steel sheet including a chemical composition containing, by mass, C: 0.030% or more and 0.250% or less, Si: 0.01% or more and 3.00% or less, Mn: 2.50% to 8.00%, P: 0.001% or more and 0.100% or less, S: 0.0001% or more and 0.0200% or less, N: 0.0005% or more and 0.0100% or less, and Al: 0.001% or more and 2.000% or less, with the balance being Fe and incidental impurities; a steel microstructure including, by area, ferrite: 30% or more and 80% or less, tempered martensite: 3.0% or more and 35% or less, and retained austenite: 8% or more, wherein a quotient of an area fraction of grains of the retained austenite, the grains having an aspect ratio of 2.0 or more and a minor axis length of 1 μm or less, divided by a total area fraction of the retained austenite is 0.3 or more, wherein a quotient of an average Mn content (mass %) in the retained austenite divided by an average Mn content (mass %) in the ferrite is 1.5 or more, and a product of the quotient of the average Mn content (mass %) in the retained austenite divided by the average Mn content (mass %) in the ferrite and an average aspect ratio of the retained austenite is 3.0 or more, wherein a quotient of an average C content (mass %) in the retained austenite divided by an average C content (mass %) in the ferrite is 3.0 or more, wherein a quotient of the average C content (mass %) in the retained austenite divided by the average Mn content (mass %) in the retained austenite is less than 0.05, and wherein a content of diffusible hydrogen in steel is 0.3 ppm by mass or less.

[2] The high strength steel sheet described in [1], wherein the chemical composition further contains at least one element selected from, by mass, Ti: 0.200% or less, Nb: 0.200% or less, V: 0.500% or less, W: 0.500% or less, B: 0.0050% or less, Ni: 1.000% or less, Cr: 1.000% or less, Mo: 1.000% or less, Cu: 1.000% or less, Sn: 0.200% or less, Sb: 0.200% or less, Ta: 0.100% or less, Ca: 0.0050% or less, Mg: 0.0050% or less, Zr: 0.0050% or less, and REM: 0.0050% or less.

[3] The high strength steel sheet described in [1] or [2], the high strength steel sheet further including a galvanized layer disposed on a surface of the high strength steel sheet.

[4] The high strength steel sheet described in [3], wherein the galvanized layer is a galvannealed layer.

[5] A method for manufacturing a high strength steel sheet including a steel microstructure including, by area, ferrite: 30% or more and 80% or less, tempered martensite: 3% or more and 35% or less, and retained austenite: 8% or more, wherein a quotient of an area fraction of grains of the retained austenite, the grains having an aspect ratio of 2.0 or more and a minor axis length of 1 μm or less, divided by a total area fraction of the retained austenite is 0.3 or more, wherein a quotient of an average Mn content (mass %) in the retained austenite divided by an average Mn content (mass %) in the ferrite is 1.5 or more, and a product of the quotient of the average Mn content (mass %) in the retained austenite divided by the average Mn content (mass %) in the ferrite and an average aspect ratio of the retained austenite is 3.0 or more, wherein a quotient of an average C content (mass %) in the retained austenite divided by an average C content (mass %) in the ferrite is 3.0 or more, wherein a quotient of the average C content (mass %) in the retained austenite divided by the average Mn content (mass %) in the retained austenite is less than 0.05, and wherein a content of diffusible hydrogen in steel is 0.3 ppm by mass or less, the method including hot rolling a steel slab having the chemical composition described in [1] or [2], then performing coiling at 300° C. or more and 750° C. or less, subsequently performing cold rolling, then performing holding at a temperature equal to or higher than an $Ac_3$ transformation temperature −50° C. for 20 s or more and 1800 s or less, subsequently performing cooling to a cooling stop temperature equal to or lower than a martensitic transformation start temperature, then performing reheating to a reheating temperature equal to or higher than an $Ac_1$ transformation temperature and equal to or lower than the $Ac_1$ transformation temperature +150° C., subsequently performing holding at the reheating temperature for 20 s or more and 1800 s or less, then performing cooling to 100° C. or less, then performing holding at higher than 100° C. and 400° C. or less for 10 s or more, and subsequently performing cooling.

[6] The method for manufacturing a high strength steel sheet described in [5], the method further including, subsequent to the coiling, performing holding at a temperature equal to or lower than the $Ac_1$ transformation temperature for more than 1800 s.

[7] The method for manufacturing a high strength steel sheet described in [5] or [6], the method further including, subsequent to the holding at the temperature equal to or higher than the $Ac_1$ transformation temperature and equal to or lower than the $Ac_1$ transformation temperature +150° C. for 20 s or more and 1800 s or less, performing cooling, then performing a galvanizing treatment, and subsequently performing the cooling to 100° C. or less.

[8] The method for manufacturing a high strength steel sheet described in [7], the method further including, subsequent to the galvanizing treatment, performing an alloying treatment of zinc coating at 450° C. or more and 600° C. or less.

According to aspects of the present invention, a high strength steel sheet that has a high yield ratio (YR) of more than 0.70 and a TS (tensile strength) of 980 MPa or more and is excellent in terms of formability, that is, specifically, not only ductility but also stretch flangeability and bendability, can be produced. Applying a high strength steel sheet produced by the manufacturing method according to aspects of the present invention to, for example, automotive structural components reduces the weights of car bodies and thereby improves fuel economy. Thus, the use of the high strength steel sheet is highly valuable from an industrial viewpoint.

DETAILED DESCRIPTION OF EMBODIMENTS OF THE INVENTION

Embodiments of the present invention are specifically described below. Hereinafter, "%" used for describing the contents of elements means "% by mass" unless otherwise specified.

(1) The reasons for which the contents of the constituents of steel are limited to the above ranges in accordance with aspects of the present invention are described below.

C: 0.030% or More and 0.250% or Less

C is an element necessary for forming low temperature transformation phases, such as tempered martensite, and thereby increasing strength. C is also an element effective for enhancing the stability of retained austenite and ductility of steel. If the C content is less than 0.030%, it becomes difficult to achieve the intended area fraction of tempered martensite and the intended strength may fail to be achieved. Moreover, it becomes difficult to achieve a sufficient area fraction of retained austenite and suitable ductility may fail to be achieved. If C is added to steel in an excessive amount such that the C content exceeds 0.250%, the area fraction of hard tempered martensite is increased to an excessive level. In such a case, during a hole expanding test, the amount of microvoids formed at the grain boundaries of tempered martensite may be increased and the propagation of cracks may proceed disadvantageously. Thus, stretch flangeability may become degraded. Furthermore, the weld zone and the heat-affected zone may become hardened significantly and, consequently, the mechanical properties of the weld zone may become degraded. Thus, spot weldability, arc weldability, and the like may become degraded. From the above-described viewpoints, the C content is limited to 0.030% or more and 0.250% or less. The C content is preferably 0.080% or more and 0.200% or less.

Si: 0.01% or More and 3.00% or Less

Si is effective for achieving suitable ductility since it enhances the strain hardenability of ferrite. If the Si content is less than 0.01%, the advantageous effects of the addition of Si may be poor. Thus, the lower limit is set to 0.01%. Adding Si to steel in an excessive amount such that the Si content exceeds 3.00% may cause steel embrittlement, which degrades ductility and bendability, and formation of red scale, which degrades surface quality. Furthermore, the quality of coating may become degraded. Accordingly, the Si content is limited to 0.01% or more and 3.00% or less. The Si content is preferably 0.20% or more and 2.00% or less and is more preferably 0.20% or more and less than 0.70%.

Mn: 2.50% or More and 8.00% or Less

Mn is an additional element extremely important in accordance with aspects of the present invention. Mn is an element that stabilizes retained austenite and is effective for achieving suitable ductility. Mn is also an element that increases steel strength by solid solution strengthening. Mn is also effective for forming stable retained austenite at which Mn is concentrated and achieving suitable ductility. The above-described actions are confirmed when the Mn content in steel is 2.50% or more. However, if Mn is added to steel in an excessive amount such that the Mn content exceeds 8.00%, the area fraction of hard tempered martensite is increased to an excessive level. In such a case, during a hole expanding test, the amount of microvoids formed at the grain boundaries of tempered martensite may be increased and the propagation of cracks may proceed disadvantageously. Thus, stretch flangeability may become degraded. Furthermore, ease of conversion treatment and the quality of coating may become degraded. From the above-described viewpoints, the Mn content is limited to 2.50% or more and 8.00% or less. The Mn content is preferably 3.10% or more and 6.00% or less and is more preferably 3.20% or more and 4.20% or less.

P: 0.001% or More and 0.100% or Less

P is an element that causes solid solution strengthening and may be added to steel in accordance with the intended strength. P is also an element that facilitates ferrite transformation and is therefore effective for forming a multiphase microstructure. In order to produce the above-described advantageous effects, it is necessary to limit the P content to 0.001% or more. If the P content exceeds 0.100%, weldability may become degraded. Moreover, in the case where the alloying treatment of zinc coating is performed, the alloying rate may be reduced and the quality of the zinc coating may become degraded. Accordingly, the P content is limited to 0.001% or more and 0.100% or less and is preferably 0.005% or more and 0.050% or less.

S: 0.0001% or More and 0.0200% or Less

S segregates at grain boundaries to cause steel embrittlement during hot working and is present in the form of sulfides, which degrade local deformability. Accordingly, it is necessary to limit the S content to 0.0200% or less. The S content is preferably 0.0100% or less and is more preferably 0.0050% or less. However, due to the limitations of production technology, it is necessary to limit the S content to 0.0001% or more. Accordingly, the S content is limited to 0.0001% or more and 0.0200% or less. The S content is preferably 0.0001% or more and 0.0100% or less and is more preferably 0.0001% or more and 0.0050% or less.

N: 0.0005% or More and 0.0100% or Less

N is an element that degrades the aging resistance of steel. The degradation of aging resistance becomes particularly significant if the N content exceeds 0.0100%. Although it is preferable to minimize the N content, it is necessary to limit the N content to 0.0005% or more due to the limitations of production technology. Accordingly, the N content is limited to 0.0005% or more and 0.0100%. The N content is preferably 0.0010% or more and 0.0070% or less.

Al: 0.001% or More and 2.000% or Less

Al is an element that widens the ferrite-austenite dual phase region and is effective for reducing the dependence of mechanical properties on the annealing temperature, that is, enhancing the stability of mechanical properties. The lower limit is set to 0.001% because the advantageous effects of addition of Al are poor if the Al content is less than 0.001%. Al is also an element that serves as a deoxidizing agent and is effective for the index of cleanliness of steel. Thus, it is preferable to add Al to steel in the deoxidization step. However, adding Al to steel in an excessive amount such that the Al content exceeds 2.000% increases the risk of steel slabs cracking during continuous casting and reduces manufacturability. From the above viewpoints, the Al content is limited to 0.001% or more and 2.000% or less. The Al content is preferably 0.200% or more and 1.200% or less.

In addition to the above-described constituents, the chemical composition may contain at least one element selected from, by mass, Ti: 0.200% or less, Nb: 0.200% or less, V: 0.500% or less, W: 0.500% or less, B: 0.0050% or less, Ni: 1.000% or less, Cr: 1.000% or less, Mo: 1.000% or less, Cu: 1.000% or less, Sn: 0.200% or less, Sb: 0.200% or less, Ta: 0.100% or less, Ca: 0.0050% or less, Mg: 0.0050% or less, Zr: 0.0050% or less, and REM (abbreviation for rare earth metals): 0.0050% or less.

Ti: 0.200% or Less

Ti is effective for the precipitation strengthening of steel. Ti increases the strength of ferrite, thereby reduces the difference in hardness between ferrite and the hard second phase (tempered martensite or retained austenite), and consequently enables further suitable stretch flangeability to be achieved. In the case where Ti is added to steel, the Ti content is preferably 0.005% or more and is further preferably 0.010% or more. However, if the Ti content exceeds 0.200%, the area fraction of hard tempered martensite is increased to an excessive level. In such a case, during a hole expanding test, the amount of microvoids formed at the grain boundaries of tempered martensite may be increased and the propagation of cracks may proceed disadvantageously. Thus, stretch flangeability may become degraded. Accordingly, in the case where Ti is added to steel, the Ti content is limited to 0.200% or less. The Ti content is preferably 0.100% or less.

Nb: 0.200% or Less, V: 0.500% or Less, and W: 0.500% or Less

Nb, V, and W are effective for the precipitation strengthening of steel. Furthermore, similarly to the advantageous effects of addition of Ti, Nb, V, and W increase the strength of ferrite, thereby reduce the difference in hardness between ferrite and the hard second phase (tempered martensite or retained austenite), and consequently enable further suitable stretch flangeability to be achieved. In the case where Nb, V, and W are added to steel, the Nb, V, and W contents are each preferably 0.005% or more and are each more preferably 0.010% or more. However, if the Nb content exceeds 0.200% or the V or W content exceeds 0.500%, the area fraction of hard tempered martensite is increased to an excessive level. In such a case, during a hole expanding test, the amount of microvoids formed at the grain boundaries of tempered martensite may be increased and the propagation of cracks may proceed disadvantageously. Thus, stretch flangeability may become degraded. Accordingly, in the case where Nb is added to steel, the Nb content is limited to 0.200% or less. The Nb content is preferably 0.100% or less. In the case where V or W is added to steel, the V or W content is limited to 0.500% or less. The V or W content is preferably 0.300% or less.

B: 0.0050% or Less

B inhibits the formation and growth of ferrite at austenite grain boundaries. B increases the strength of ferrite, thereby reduces the difference in hardness between ferrite and the hard second phase (tempered martensite or retained austenite), and consequently enables further suitable stretch flangeability to be achieved. In the case where B is added to steel, the B content is preferably 0.0003% or more and is more preferably 0.0005% or more. However, if the B content exceeds 0.0050%, formability may become degraded. Accordingly, in the case where B is added to steel, the B content is limited to 0.0050% or less. The B content is preferably 0.0030% or less.

Ni: 1.000% or Less

Ni is an element that stabilizes retained austenite and is effective for achieving further suitable ductility. Ni is also an element that increases steel strength by solid solution strengthening. In the case where Ni is added to steel, the Ni content is preferably 0.005% or more. However, if the Ni content exceeds 1.000%, the area fraction of hard tempered martensite is increased to an excessive level. In such a case, during a hole expanding test, the amount of microvoids formed at the grain boundaries of tempered martensite may be increased and the propagation of cracks may proceed disadvantageously. Thus, stretch flangeability may become degraded. Accordingly, in the case where Ni is added to steel, the Ni content is limited to 1.000% or less.

Cr: 1.000% or Less and Mo: 1.000% or Less

Cr and Mo may be added to steel as needed because they enhance the balance between strength and ductility. In the case where Cr and Mo are added to steel, the Cr and Mo contents are each preferably 0.005% or more. However, if Cr and Mo are added to steel in excessive amounts such that the Cr content exceeds 1.000% and the Mo content exceeds 1.000%, the area fraction of hard tempered martensite is increased to an excessive level. In such a case, during a hole expanding test, the amount of microvoids formed at the grain boundaries of tempered martensite may be increased and the propagation of cracks may proceed disadvantageously. Thus, stretch flangeability may become degraded. Accordingly, in the case where the above elements are added to steel, the contents of the elements are each limited to 1.000% or less.

Cu: 1.000% or Less

Cu may be added to steel as needed because it is an element effective for strengthening of steel. If Cu is added to steel, the Cu content is preferably 0.005% or more. However, if Cu is added to steel in an excessive amount such that the Cu content exceeds 1.000%, the area fraction of hard tempered martensite is increased to an excessive level. In such a case, during a hole expanding test, the amount of microvoids formed at the grain boundaries of tempered martensite may be increased and the propagation of cracks may proceed disadvantageously. Thus, stretch flangeability may become degraded. Accordingly, in the case where Cu is added to steel, the Cu content is limited to 1.000% or less.

Sn: 0.200% or Less and Sb: 0.200% or Less

Sn and Sb are added to steel as needed in order to inhibit a region of the surface layer of the steel sheet which has a thickness of several tens of micrometers from being decarburized as a result of nitriding or oxidation of the surface of the steel sheet. Sn and Sb are effective for inhibiting the above nitriding or oxidation, preventing a reduction in the area fraction of tempered martensite in the surface of the steel sheet, and achieving certain strength and the stability of mechanical properties. In the case where Sn and Sb are added to steel, the Sn and Sb contents are each preferably 0.002% or more. However, if any of the above elements is added to steel in an excessive amount such that the content of the element exceeds 0.200%, toughness may become degraded. Accordingly, in the case where Sn and Sb are added to steel, the Sn and Sb contents are each limited to 0.200% or less.

Ta: 0.100% or Less

Similarly to Ti and Nb, Ta increases strength by forming an alloy carbide and an alloy carbonitride. Furthermore, it is considered that Ta partially dissolves in Nb carbide or carbonitride to form a composite precipitate, such as (Nb,Ta)(C,N), thereby markedly reduces the coarsening of the precipitates, and stabilizes the increase in strength by precipitation strengthening. Therefore, Ta is preferably added to steel. In the case where Ta is added to steel, the Ta content is preferably 0.001% or more. Even if Ta is added to steel in an excessive amount, the above precipitation stabilization effect may become saturated and the costs of the alloying elements are also increased. Accordingly, in the case where Ta is added to steel, the Ta content is limited to 0.100% or less.

Ca: 0.0050% or Less, Mg: 0.0050% or Less, Zr: 0.0050% or Less, and REM: 0.0050% or Less Ca, Mg, Zr, and REMs are elements effective for increasing the sphericity of sulfides and reducing the adverse effects of the sulfides on stretch flangeability. In the case where the above elements are added to steel, the contents of the elements are each preferably 0.0005% or more. However, if any of the above elements is added to steel in an excessive amount such that the content of the element exceeds 0.0050%, the amount of inclusions and the like may be increased and, consequently, surface and internal defects may occur. Accordingly, if Ca, Mg, Zr, and REMs are added to steel, the Ca, Mg, Zr, and REM contents are each limited to 0.0050% or less.

The constituent other than the above-described constituents, that is, the balance, includes Fe and incidental impurities.

(2) The steel microstructure is described below.

Area Fraction of Ferrite: 30% or More and 80% or Less

It is necessary to limit the area fraction of ferrite to 30% or more in order to achieve sufficient ductility. It is also necessary to limit the area fraction of soft ferrite to 80% or less in order to achieve a tensile strength of 980 MPa or more. Note that the term "ferrite" used herein refers to polygonal ferrite, granular ferrite, and acicular ferrite, that is, ferrite materials that are relatively soft and rich in ductility. The area fraction of ferrite is preferably 40% or more and 75% or less.

Area Fraction of Tempered Martensite: 3.0% or More and 35% or Less

The area fraction of tempered martensite needs to be 3.0% or more in order to achieve a high local elongation, suitable stretch flangeability, suitable bendability, and a high yield ratio. It is necessary to limit the area fraction of tempered martensite to 3.0% or more in order to achieve a high local elongation, suitable stretch flangeability, suitable bendability, and a high yield ratio. It is also necessary to limit the area fraction of tempered martensite to 35% or less in order to achieve a TS of 980 MPa or more. The area fraction of tempered martensite is preferably 5.0% or more and 20% or less.

The area fractions of ferrite and tempered martensite can be determined by grinding a thickness-wise cross section (L-section) of the steel sheet which is parallel to the rolling direction, etching the L-section in 3-vol % nital, then observing the ¼-thickness position (i.e., the position ¼ of the thickness of the steel sheet below the surface in the depth direction) of the L-section with a SEM (scanning electron microscope) at a 2000-fold magnification for 10 fields of view, calculating the area fractions of the microstructure components (ferrite and tempered martensite) with "Image-Pro" produced by Media Cybernetics, Inc. for each of the 10 fields of view on the basis of the resulting microstructure images, and taking the averages thereof. In the above microstructure images, ferrite appears as a gray microstructure component (base microstructure) and tempered martensite appears as a microstructure component that includes a white (quenched) martensite portion and a gray inner structure formed inside the martensite portion.

Area Fraction of Retained Austenite: 8% or More

It is necessary to limit the area fraction of retained austenite to 8% or more in order to achieve sufficient ductility. The area fraction of retained austenite is preferably 12% or more and 25% or less.

The area fraction of retained austenite was determined by grinding the steel sheet to a position 0.1 mm below the ¼-thickness position, further grinding the steel sheet 0.1 mm by chemical polishing, then measuring the integrated intensity ratios of diffraction peaks on the {200}, {220}, and {311} planes of fcc iron and the {200}, {211}, and {220} planes of bcc iron with an X-ray diffraction apparatus using CoKα radiation, and taking the averages of the nine integrated intensity ratios.

Quotient of Area Fraction of Retained Austenite Grains Having Aspect Ratio of 2.0 or More and Minor Axis Length of 1 μm or Less Divided by Total Area Fraction of Retained Austenite is 0.3 or More Limiting the quotient of the area fraction of retained austenite grains having an aspect ratio of 2.0 or more and a minor axis length of 1 μm or less divided by the total area fraction of the retained austenite to 0.3 or more is an important condition constituting an aspect of the present invention. The retained austenite grains having an aspect ratio of 2.0 or more and a minor axis length of 1 μm or less reduce the likelihood of voids being formed during punching performed prior to the flange forming step and thereby enhance stretch flangeability. For achieving suitable stretch flangeability, the area fraction of retained austenite grains having an aspect ratio of 2.0 or more and a minor axis length of 1 μm or less needs to be high, in addition to satisfying the area fraction of retained austenite which is high enough to achieve high ductility. The above index is preferably 0.5 or more. The upper limit for the above aspect ratio is preferably 15.0 or less. The lower limit for the above minor axis length is preferably 0.05 μm or more, which is the detection limit in EBSD.

Tempered martensite and retained austenite were identified using a phase map obtained by EBSD (electron backscattered diffraction). The aspect ratio of a retained austenite grain was calculated by drawing an ellipse circumscribing the retained austenite grain with "Photoshop elements 13" and dividing the length of the major axis of the ellipse by the length of the minor axis of the ellipse.

Quotient of Average Mn Content (Mass %) in Retained Austenite Divided by Average Mn Content (Mass %) in Ferrite: 1.5 or More Limiting the quotient of the average Mn content (mass %) in retained austenite divided by the average Mn content (mass %) in ferrite to 1.5 or more is an extremely important condition constituting an aspect of the present invention. For achieving suitable ductility, the area fraction of stable retained austenite at which Mn is concentrated needs to be high. The above index is preferably 2.0 or more. Although the upper limit for the above quotient is not limited because the higher the average Mn content in retained austenite, the higher the ductility, the above index is preferably 10.0 or less.

Product of Quotient of Average Mn Content (Mass %) in Retained Austenite Divided by Average Mn Content (Mass %) in Ferrite and Average Aspect Ratio of Retained Austenite Grains is 3.0 or More Limiting the product of the quotient of the average Mn content (mass %) in retained austenite divided by the average Mn content (mass %) in ferrite and the average aspect ratio of retained austenite grains to 3.0 or more is an extremely important condition. For achieving suitable ductility, the area fraction of stable retained austenite grains having a high aspect ratio at which Mn is concentrated needs to be high. If the product of the quotient of the average Mn content (mass %) in retained austenite divided by the average Mn content (mass %) in ferrite and the average aspect ratio of retained austenite grains is less than 3.0, the likelihood of voids being formed during punching performed prior to the flange forming step is significantly increased and, consequently, stretch flangeability may become degraded. The above index is preferably 4.0 or more. The upper limit for the above index is suitably 20.0 or less.

Quotient of C Content (Mass %) in Retained Austenite Divided by Average C Content (Mass %) in Ferrite: 3.0 or More Limiting the quotient of the C content (mass %) in retained austenite divided by the average C content (mass %) in ferrite to 3.0 or more is an extremely important condition constituting an aspect of the present invention. For achieving suitable ductility and bendability, the area fraction of stable retained austenite at which Mn is concentrated needs to be high. The above index is preferably 5.0 or more. The upper limit for the above index is suitably 10.0 or less.

Quotient of Average C Content (Mass %) in Retained Austenite Divided by Average Mn Content (Mass %) in Retained Austenite is Less Than 0.05

Limiting the quotient of the C content (mass %) in retained austenite divided by the Mn content (mass %) in retained austenite to less than 0.05 is an extremely important condition constituting an aspect of the present invention. For achieving a high YR, when Mn is concentrated in retained austenite including C and Mn in a suitable manner in a larger amount than C, the stability of retained austenite is increases and yield stress is increased accordingly. The above index is preferably 0.02 or more and 0.04 or less.

The C and Mn contents in retained austenite and ferrite are determined with 3-dimensional atom probe (3DAP) using a sample taken from the ¼-thickness position. First, a portion of the steel sheet which includes retained austenite and ferrite is sampled and then formed into an acicular sample using focused ion beam. A voltage is applied to the acicular sample with the 3DAP, and C and Mn ions released upon the voltage application are analyzed. The Mn content can be determined in terms of atom % by dividing the numbers of C and Mn atoms measured by the total number of all the atoms measured, for each of retained austenite and ferrite. The above measurement is performed for each of 30 retained austenite grains and 30 ferrite grains which are randomly selected in the field of view, and the averages of the C and Mn contents determined by the quantitative analysis are calculated. The C and Mn contents (mass %) in retained austenite and ferrite can be obtained by converting the C and Mn contents (atom %) to a mass basis.

The advantageous effects according to aspects of the present invention are not impaired even if the steel microstructure according to aspects of the present invention contains quenched martensite, bainite, pearlite, or carbides, such as cementite, in addition to ferrite, tempered martensite, and retained austenite, when the area fraction of the quenched martensite, bainite, pearlite, or carbides is 10% or less.

Content of Diffusible Hydrogen in Steel is 0.3 ppm by Mass or Less

Limiting the content of diffusible hydrogen in steel to 0.3 ppm by mass or less is an important condition constituting an aspect of the present invention. For achieving a high local elongation and suitable stretch flangeability, it is necessary to limit the content of diffusible hydrogen in steel to 0.3 ppm by mass or less. The content of diffusible hydrogen in steel is preferably 0.2 ppm by mass or less. A test specimen having a length of 30 mm and a width of 5 mm was taken from an annealed steel sheet. After the coated layer had been removed by grinding, the content of diffusible hydrogen in steel and the peak of release of diffusible hydrogen were measured. The release peak was measured by thermal desorption spectrometry (TDS) at a heating rate of 200° C./hr. The hydrogen detected at 300° C. or less was considered diffusible hydrogen.

The steel sheet may include a galvanized layer disposed on the surface. The galvanized layer may be a galvannealed layer formed by performing an alloying treatment of the galvanized layer.

(3) Manufacturing conditions are described below.

Temperature at Which Steel Slab is Heated

When the slab is heated, the temperature at which the slab is heated is preferably, but not limited to, 1100° C. or more and 1300° C. or less. Since the precipitates present when the steel slab is heated are present in the form of coarse precipitates in the final steel sheet and do not affect strength, the Ti- and Nb-based precipitates formed during casting can be again dissolved. It is also preferable to limit the temperature at which the steel slab is heated to 1100° C. or more in order to scale off air bubbles, segregation, and the like present in the slab surface layer, further reduce cracks and irregularities present in the surface of the steel sheet, and thereby further flatten the surface of the steel sheet. The temperature at which the steel slab is heated is preferably 1300° C. or less in order to reduce scale loss caused with an increase in oxidation. The above slab heating temperature is more preferably 1150° C. or more and 1250° C. or less.

The steel slab is preferably manufactured by a continuous casting process in order to prevent macrosegregation. Alternatively, the steel slab may be manufactured by ingot casting, thin-slab casting, or the like. In addition to the conventional method in which, subsequent to the production of the steel slab, the steel slab is cooled to room temperature and then reheated, energy-saving processes, such as hot charge rolling and hot direct rolling, in which the steel slab is not cooled to room temperature but charged into a heating furnace while the temperature of the steel slab is high or the steel slab is rolled immediately after heat insulation has been done for a short period of time, may be used without problems. The slab is formed into a sheet bar by rough rolling under common conditions. In the case where the heating temperature is relatively low, the sheet bar is preferably heated with a bar heater or the like prior to finish rolling in order to prevent the occurrence of troubles during hot rolling.

Finish Rolling Delivery Temperature in Hot Rolling: 750° C. or More and 1000° C. or Less The heated steel slab is hot rolled to form a hot rolled steel sheet by rough rolling and finish rolling. If the above finishing temperature exceeds 1000° C., the amount of oxides (scales) formed rapidly increases, the roughness of the interface between the base iron and the oxides is increased accordingly, and surface quality may become degraded subsequent to pickling and cold rolling. Furthermore, if hot rolling scales partially remain unremoved subsequent to pickling, they may adversely affect ductility and stretch flangeability. Moreover, grain size may be increased to an excessive level and the roughness of the surface of a pressed article may be increased during working. If the above finishing temperature is less than 750° C., the rolling force is increased, the rolling load is increased accordingly, and the rolling reduction ratio performed while austenite is in a non-recrystallization state is increased. In such a case, an abnormal texture may develop. Consequently, the in-plane anisotropy of the final product is increased significantly. This may degrade not only the uniformity of material quality (stability of mechanical properties) but ductility. In addition, the aspect ratio of retained austenite grains is reduced and, consequently, ductility and stretch flangeability may become degraded. Accordingly, the finish rolling delivery temperature in hot rolling is preferably 750° C. or more and 1000° C. or less and is preferably 800° C. or more and 950° C. or less.

Temperature at Which Coiling is Performed Subsequent to Hot Rolling: 300° C. or More and 750° C. or Less If the temperature at which coiling is performed subsequent to hot rolling exceeds 750° C., the grain size of ferrite included in the microstructure of the hot rolled steel sheet is increased, the aspect ratio of retained austenite grains included in the final annealed steel sheet is reduced, and stretch flangeability becomes degraded consequently. If the temperature at which coiling is performed subsequent to hot rolling is less than 300° C., the strength of the hot rolled steel sheet is increased. In such a case, the rolling load required for cold rolling may be increased and defects of the shape of the steel sheet may occur. This reduces productivity. Accordingly, it is necessary to limit the temperature at which coiling is performed subsequent to hot rolling to 300° C. or more and 750° C. or less. The above coiling temperature is preferably 400° C. or more and 650° C. or less.

The finish rolling may be performed in a continuous manner by joining the rough rolled steel sheets to one another during hot rolling. The rough rolled steel sheets may be coiled temporarily. In order to reduce the rolling force required for hot rolling, a part or the entirety of the finish rolling may be performed using a lubricant. It is also preferable to perform lubrication rolling in order to increase the uniformity in the shape of the steel sheet and the uniformity of material quality. In the case where lubrication rolling is performed, the coefficient of friction at which the lubrication rolling is performed is preferably 0.10 or more and 0.25 or less.

The hot rolled steel sheet produced in the above-described manner may be pickled optionally. It is preferable to perform pickling because it enables the removal of oxides present on the surface of the steel sheet and further improves ease of conversion treatment and the quality of coating. The pickling may be performed in a single stage or multiple stages.

Holding at Temperature Equal to or Lower Than $Ac_1$ Transformation Temperature for More Than 1800 s It is preferable to perform holding at a temperature equal to or lower than the $Ac_1$ transformation temperature for more than 1800 s because it softens the steel sheet that is to be cold rolled in the subsequent step. If holding is performed at a temperature higher than the $Ac_1$ transformation temperature, Mn concentrates at austenite, hard quenched martensite and retained austenite are formed subsequent to cooling, and the steel sheet may fail to be softened. If holding is performed at a temperature higher than the $Ac_1$ transformation temperature, furthermore, massive quenched martensite and retained austenite are formed. The massive microstructure remains even in the subsequent heat treatment. Consequently, aspect ratio may be reduced and stretch flangeability may become degraded. Even at a temperature equal to or lower than the $Ac_1$ transformation temperature, if the holding time is 1800 s or less, it becomes difficult to eliminate the strain that remains subsequent to hot rolling and the steel sheet may fail to be softened.

The heat treatment may be performed by any annealing method, such as continuous annealing or batch annealing. Subsequent to the above heat treatment, cooling is performed to room temperature. The method with which the cooling is performed and the rate at which the cooling is performed are not limited. Any cooling method, such as furnace cooling or natural cooling in batch annealing, or gas jet cooling, mist cooling, or water cooling in continuous annealing, may be used. In the case where a pickling treatment is performed, a conventional method may be used.

Cold Rolling

The resulting steel sheet is cold rolled. The cold rolling reduction ratio is preferably, but not limited to, 15% or more and 80% or less. Performing cold rolling at the above reduction ratio enables formation of a sufficiently recrystallized, intended microstructure and improves properties.

Holding at Temperature Equal to or Higher Than $Ac_3$ Transformation Temperature $-50°$ C. for 20 s or More and 1800 s or Less If holding is performed at a temperature less than the $Ac_3$ transformation temperature $-50°$ C., Mn concentrates at austenite, martensitic transformation does not occur during cooling, and cores of retained austenite grains having a high aspect ratio may fail to be formed consequently. In such a case, in the subsequent annealing step, retained austenite may be formed at the grain boundaries disadvantageously. This increases the amount of retained austenite grains having a low aspect ratio and makes it impossible to form the intended microstructure. Even at a temperature equal to or higher than the $Ac_3$ transformation temperature $-50°$ C., if the holding time is less than 20 s, recrystallization does not occur to a sufficient degree and the intended microstructure fails to be formed. Consequently, ductility may become degraded. Furthermore, it becomes impossible to concentrate Mn at the surface in order to maintain the quality of coating at a certain level. If the above holding is performed for more than 1800 s, the concentration of Mn at the surface becomes saturated, the amounts of hard tempered martensite and retained austenite included in the surface of the steel sheet that has been subjected to the final annealing treatment are increased, and bendability may become degraded consequently.

Cooling to Cooling Stop Temperature Equal to or Lower Than Martensitic Transformation Start Temperature If the cooling stop temperature is higher than the martensitic transformation start temperature, when the amount of quenched martensite that is to be transformed is small, cores of retained austenite grains having a high aspect ratio fail to be formed. In such a case, in the subsequent annealing step, retained austenite may be formed at the grain boundaries disadvantageously. This increases the amount of retained austenite grains having a low aspect ratio and makes it impossible to form the intended microstructure. Furthermore, the amount of Mn concentrated at retained austenite is reduced and a high YR may fail to be achieved consequently. The cooling stop temperature is preferably equal to or higher than the martensitic transformation start temperature −250° C. and equal to or lower than the martensitic transformation start temperature −50° C.

Reheating to Reheating Temperature Equal to or Higher Than $Ac_1$ Transformation Temperature and Equal to or Lower Than $Ac_1$ Transformation Temperature +150° C. and Subsequently Holding at Reheating Temperature for 20 s or More and 1800 s or Less Performing holding at a temperature equal to or higher than the $Ac_1$ transformation temperature and equal to or lower than the $Ac_1$ transformation temperature +150° C. for 20 s or more and 1800 s or less is an extremely important condition constituting an aspect of the present invention. If the holding is performed at a temperature lower than the $Ac_1$ transformation temperature for less than 20 s, the carbides formed during heating remain undissolved, it becomes difficult to form sufficient area fractions of tempered martensite and retained austenite subsequent to the final annealing treatment, and strength is reduced consequently. Furthermore, C and Mn fail to concentrate at retained austenite at sufficient levels. Consequently, ductility and bendability become degraded. If the reheating temperature exceeds the $Ac_1$ transformation temperature +150° C., the area fraction of martensite is increased. Furthermore, the concentration of Mn at austenite becomes saturated. Consequently, a sufficient area fraction of retained austenite fails to be formed and ductility becomes degraded. In addition, massive retained austenite is formed. This results in a reduction in aspect ratio and degradation of stretch flangeability. The reheating temperature is preferably equal to or lower than the $Ac_1$ transformation temperature +100° C. If the holding is performed for more than 1800 s, the growth of austenite grains in the minor axis direction is accelerated. This results in a reduction in aspect ratio and degradation of stretch flangeability. Moreover, the concentration of C at retained austenite occurs. As a result, it becomes difficult to achieve the intended quotient of the average C content (mass %) in retained austenite divided by the average Mn content (mass %) in retained austenite and the high YR. In the case where a galvanizing treatment is subsequently performed, cooling is performed prior to the galvanizing treatment. The cooling stop temperature prior to galvanization is preferably 350° C. or more and 550° C. or less.

Galvanizing Treatment

In the case where a hot-dip galvanizing treatment is performed, subsequent to the annealing treatment (reheating to a reheating temperature equal to or higher than the $Ac_1$ transformation temperature and equal to or lower than the $Ac_1$ transformation temperature +150° C. and holding at the reheating temperature for 20 s or more and 1800 s or less), the steel sheet is cooled to a temperature equal to or higher than the temperature of the galvanizing bath by gas jet cooling, furnace cooling, or the like and subsequently dipped into a galvanizing bath having a temperature of 440° C. or more and 500° C. or less in order to perform a hot-dip galvanizing treatment. Then, the weight of coating is adjusted by gas wiping or the like. For hot-dip galvanizing, a galvanizing bath having an Al content of 0.08% or more and 0.30% or less is preferably used. Instead of a hot-dip galvanizing treatment, an electrogalvanizing treatment or the like may be used.

In the case where an alloying treatment of zinc coating is performed, subsequent to the galvanizing treatment, an alloying treatment of zinc coating is performed at 450° C. or more and 600° C. or less. If the alloying treatment is performed at more than 600° C., untransformed austenite may transform into pearlite, and the intended area fraction of retained austenite may fail to be achieved. Consequently, ductility may become degraded. Accordingly, in the case where an alloying treatment of zinc coating is performed, it is preferable to perform an alloying treatment of zinc coating at 450° C. or more and 600° C. or less.

Cooling to 100° C. or Less

Performing cooling to 100° C. or less enables an amount of tempered martensite which is large enough to achieve the certain tensile strength to be formed subsequent to the final annealing treatment. Furthermore, it is preferable to perform cooling to about 20° C. or more and about 50° C. or less prior to the subsequent step of performing holding at higher than 100° C. and 400° C. or less for 10 s or more. In the case where the galvanizing treatment or an alloying treatment of zinc coating is performed, it is performed prior to this step, that is, the step of performing cooling to 100° C. or less.

Holding at More Than 100° C. and 400° C. or Less for 10 s or More

Performing holding at more than 100° C. and 400° C. or less for 10 s or more as a final heat treatment (final annealing treatment) is important in accordance with aspects of the present invention. If holding is performed at 100° C. or less or for less than 10 s, a sufficient area fraction of tempered martensite fails to be formed. Furthermore, diffusible hydrogen included in the steel is not released from the steel sheet. This results in degradation of stretch flangeability and bendability. If holding is performed at more than 400° C., a sufficient area fraction of retained austenite fails to be formed due to the decomposition of retained austenite. Consequently, steel ductility becomes degraded.

Although the other conditions for the manufacturing method are not limited, it is preferable to perform the above annealing treatment using a continuous annealing facility from the viewpoint of productivity. It is also preferable to perform the set of treatments, such as annealing, hot-dip galvanizing, and alloying of zinc coating, using CGL (continuous galvanizing line), which is a hot-dip galvanizing line.

The above "high strength steel sheet" and the "high strength galvanized steel sheet" that includes the high strength steel sheet and a galvanized layer disposed on the surface may be subjected to skin pass rolling in order to, for example, perform shape correction and the adjustment of surface roughness. The rolling reduction ratio in the skin pass rolling is preferably 0.1% or more and 2.0% or less. If the above rolling reduction ratio is less than 0.1%, the advantageous effects are small, and it is difficult to control the reduction ratio. Thus, this is considered the lower limit for the suitable rolling reduction ratio. If the rolling reduction ratio exceeds 2.0%, productivity may become degraded significantly. Thus, this is considered the upper limit for the suitable rolling reduction ratio. The skin pass rolling may be performed either online or offline. Skin pass rolling at an intended rolling reduction ratio may be performed in a single stage or multiple stages. Furthermore, various coating treatments, such as resin coating and fat coating, may be used.

EXAMPLES

Molten steels having the chemical compositions described in Table 1 with the balance being Fe and incidental impurities were prepared with a converter and formed into slabs by continuous casting process. The slabs were reheated to 1250° C. and then formed into high strength cold rolled steel sheets (CR) having a thickness of 1.0 mm or more and 1.8 mm or less under the conditions described in Table 2. Furthermore, a galvanizing treatment was performed to produce hot-dip galvanized steel sheets (GI). An alloying treatment of the hot-dip galvanized steel sheets was performed to produce hot-dip galvannealed steel sheets (GA). The hot-dip galvanizing bath used for producing the hot-dip galvanized steel sheets (GI) was a zinc bath containing Al: 0.19% by mass. The hot-dip galvanizing bath used for producing the hot-dip galvannealed steel sheets (GA) was a zinc bath containing Al: 0.14% by mass. The bath temperature was 465° C. The coating weight was 45 g/m² per side (both sides were coated). In the production of the GA steel sheets, the Fe concentration in the coated layer was adjusted to 9% by mass or more and 12% by mass or less. The cross-sectional steel microstructure, tensile properties, stretch flangeability, and bendability of each of the above steel sheets were determined. Tables 3, 4, and 5 list the results.

TABLE 1

| Steel type | Chemical composition (mass %) | | | | | | | | | | | | | | | | |
|---|---|---|---|---|---|---|---|---|---|---|---|---|---|---|---|---|---|
| | C | Si | Mn | P | S | N | Al | Ti | Nb | V | W | B | Ni | Cr | Mo | Cu | Sn |
| A | 0.166 | 0.56 | 3.53 | 0.022 | 0.0021 | 0.0035 | 0.031 | 0.045 | — | — | — | — | — | — | — | — | — |
| B | 0.186 | 0.76 | 3.23 | 0.027 | 0.0025 | 0.0042 | 0.046 | 0.039 | — | — | — | — | — | — | — | — | — |
| C | 0.178 | 1.81 | 3.60 | 0.018 | 0.0019 | 0.0022 | 0.034 | 0.032 | — | — | — | — | — | — | — | — | — |
| D | 0.243 | 0.98 | 3.30 | 0.028 | 0.0030 | 0.0026 | 0.059 | — | — | — | — | — | — | — | — | — | — |
| E | 0.050 | 1.01 | 4.09 | 0.031 | 0.0024 | 0.0027 | 0.032 | — | — | — | — | — | — | — | — | — | — |
| F | 0.182 | 2.89 | 3.98 | 0.026 | 0.0020 | 0.0025 | 0.032 | 0.043 | — | — | — | — | — | — | — | — | — |
| G | 0.199 | 0.62 | 3.53 | 0.030 | 0.0019 | 0.0034 | 0.042 | 0.050 | — | — | — | — | — | — | — | — | — |
| H | 0.083 | 1.00 | 5.13 | 0.027 | 0.0027 | 0.0032 | 0.046 | — | — | — | — | — | — | — | — | — | — |
| I | 0.179 | 1.50 | 3.78 | 0.020 | 0.0021 | 0.0026 | 0.036 | — | — | — | — | — | — | — | — | — | — |
| J | 0.158 | 0.21 | 3.50 | 0.030 | 0.0024 | 0.0038 | 0.031 | 0.046 | — | — | — | — | — | — | — | — | — |
| K | 0.126 | 0.37 | 5.94 | 0.026 | 0.0025 | 0.0032 | 0.031 | 0.050 | — | — | — | — | — | — | — | — | — |
| L | 0.191 | 0.46 | 3.14 | 0.023 | 0.0026 | 0.0027 | 0.033 | — | — | — | — | — | — | — | — | — | — |
| M | 0.154 | 0.62 | 4.20 | 0.023 | 0.0024 | 0.0031 | 0.036 | — | — | — | — | — | — | — | — | — | — |
| N | 0.172 | 0.49 | 3.21 | 0.030 | 0.0021 | 0.0043 | 0.037 | 0.040 | — | — | — | — | — | — | — | — | — |
| O | 0.161 | 0.82 | 3.43 | 0.014 | 0.0019 | 0.0035 | 0.711 | 0.039 | — | — | — | — | — | — | — | — | — |
| P | 0.157 | 0.59 | 3.54 | 0.019 | 0.0027 | 0.0029 | 1.179 | 0.043 | — | — | — | — | — | — | — | — | — |
| Q | 0.201 | 0.35 | 3.50 | 0.026 | 0.0027 | 0.0043 | 0.222 | — | — | — | — | — | — | — | — | — | — |
| R | <u>0.022</u> | 0.51 | 3.52 | 0.020 | 0.0028 | 0.0039 | 0.037 | 0.042 | — | — | — | — | — | — | — | — | — |
| S | <u>0.206</u> | <u>4.07</u> | 3.50 | 0.029 | 0.0025 | 0.0035 | 0.031 | — | — | — | — | — | — | — | — | — | — |
| T | 0.185 | <u>0.34</u> | <u>8.44</u> | 0.025 | 0.0024 | 0.0026 | 0.034 | — | — | — | — | — | — | — | — | — | — |
| U | 0.157 | 1.09 | <u>2.19</u> | 0.021 | 0.0022 | 0.0028 | 0.030 | 0.042 | — | — | — | — | — | — | — | — | — |
| V | 0.165 | 0.59 | <u>2.57</u> | 0.019 | 0.0018 | 0.0041 | 0.042 | <u>0.249</u> | — | — | — | — | — | — | — | — | — |
| W | 0.155 | 0.75 | 3.23 | 0.019 | 0.0024 | 0.0029 | 0.052 | — | 0.063 | — | — | — | — | — | — | — | — |
| X | 0.161 | 0.69 | 4.51 | 0.030 | 0.0024 | 0.0041 | 0.046 | 0.011 | 0.039 | — | — | — | — | — | — | — | — |
| Y | 0.120 | 1.14 | 3.59 | 0.032 | 0.0023 | 0.0026 | 0.045 | 0.090 | — | 0.061 | — | — | — | — | — | — | — |
| Z | 0.102 | 1.20 | 4.07 | 0.028 | 0.0027 | 0.0031 | 0.044 | — | — | — | 0.019 | — | — | — | — | — | — |
| AA | 0.149 | 0.35 | 3.46 | 0.030 | 0.0023 | 0.0044 | 0.040 | 0.019 | — | — | — | 0.0020 | — | — | — | — | — |
| AB | 0.188 | 0.67 | 5.96 | 0.025 | 0.0022 | 0.0040 | 0.015 | 0.011 | — | — | — | — | 0.042 | — | — | — | — |
| AC | 0.092 | 0.52 | 6.39 | 0.019 | 0.0027 | 0.0038 | 0.058 | 0.072 | — | — | — | — | — | 0.098 | — | — | — |
| AD | 0.149 | 0.82 | 3.64 | 0.021 | 0.0019 | 0.0037 | 0.032 | 0.049 | — | — | — | — | — | 0.527 | — | — | — |
| AE | 0.099 | 1.44 | 3.08 | 0.030 | 0.0027 | 0.0031 | 0.033 | 0.025 | — | — | — | — | — | — | 0.061 | — | — |
| AF | 0.108 | 0.50 | 3.59 | 0.024 | 0.0024 | 0.0026 | 0.041 | — | — | — | — | — | — | — | — | 0.201 | — |
| AG | 0.118 | 0.55 | 3.17 | 0.025 | 0.0021 | 0.0032 | 0.034 | 0.025 | — | — | — | — | — | — | — | — | 0.105 |
| AH | 0.161 | 0.42 | 3.25 | 0.021 | 0.0022 | 0.0027 | 0.032 | 0.035 | — | — | — | — | — | — | — | — | — |
| AI | 0.135 | 0.70 | 3.58 | 0.019 | 0.0020 | 0.0029 | 0.030 | — | — | — | — | — | — | — | — | — | — |
| AJ | 0.200 | 0.40 | 3.01 | 0.030 | 0.0029 | 0.0027 | 0.028 | — | 0.040 | — | — | — | — | — | — | — | 0.007 |
| AK | 0.211 | 0.23 | 3.69 | 0.023 | 0.0027 | 0.0039 | 0.033 | — | 0.032 | — | — | — | — | — | — | — | — |
| AL | 0.210 | 0.97 | 3.96 | 0.025 | 0.0025 | 0.0041 | 0.040 | — | — | — | — | — | — | — | — | — | — |
| AM | 0.195 | 1.25 | 3.79 | 0.021 | 0.0023 | 0.0035 | 0.035 | — | — | — | — | — | — | — | — | — | — |
| AN | 0.241 | 0.04 | 3.01 | 0.026 | 0.0022 | 0.0028 | 0.039 | 0.007 | — | — | — | — | — | — | — | — | — |
| AO | 0.078 | 0.06 | 6.11 | 0.022 | 0.0028 | 0.0037 | 0.042 | — | — | — | — | — | — | — | — | — | — |

| Steel type | Chemical composition (mass %) | | | | | | Ms temperature (° C.) | $Ac_1$ transformation temperature (° C.) | $Ac_3$ transformation temperature (° C.) | Remark |
|---|---|---|---|---|---|---|---|---|---|---|
| | Sb | Ta | Ca | Mg | Zr | REM | | | | |
| A | — | — | — | — | — | — | 352 | 656 | 771 | Invention steel |
| B | — | — | — | — | — | — | 357 | 666 | 785 | Invention steel |
| C | — | — | — | — | — | — | 345 | 667 | 817 | Invention steel |
| D | — | — | — | — | — | — | 335 | 665 | 767 | Invention steel |
| E | — | — | — | — | — | — | 370 | 647 | 794 | Invention steel |
| F | — | — | — | — | — | — | 328 | 668 | 858 | Invention steel |
| G | — | — | — | — | — | — | 340 | 656 | 770 | Invention steel |
| H | — | — | — | — | — | — | 317 | 617 | 752 | Invention steel |
| I | — | — | — | — | — | — | 337 | 659 | 785 | Invention steel |
| J | — | — | — | — | — | — | 356 | 653 | 758 | Invention steel |
| K | — | — | — | — | — | — | 269 | 587 | 703 | Invention steel |
| L | — | — | — | — | — | — | 359 | 665 | 754 | Invention steel |
| M | — | — | — | — | — | — | 329 | 638 | 739 | Invention steel |
| N | — | — | — | — | — | — | 363 | 664 | 775 | Invention steel |
| O | — | — | — | — | — | — | 378 | 661 | 920 | Invention steel |
| P | — | — | — | — | — | — | 389 | 656 | 1003 | Invention steel |
| Q | — | — | — | — | — | — | 346 | 654 | 774 | Invention steel |

TABLE 1-continued

| | | | | | | | | | | |
|---|---|---|---|---|---|---|---|---|---|---|
| R | — | — | — | — | — | — | 403 | 658 | 821 | Comparative steel |
| S | — | — | — | — | — | — | 339 | 694 | 902 | Comparative steel |
| T | — | — | — | — | — | — | 149 | 515 | 592 | Comparative steel |
| U | — | — | — | — | — | — | 408 | 699 | 836 | Comparative steel |
| V | — | — | — | — | — | — | 391 | 683 | 885 | Comparative steel |
| W | — | — | — | — | — | — | 368 | 666 | 777 | Invention steel |
| X | — | — | — | — | — | — | 315 | 630 | 738 | Invention steel |
| Y | — | — | — | — | — | — | 364 | 661 | 835 | Invention steel |
| Z | — | — | — | — | — | — | 353 | 649 | 786 | Invention steel |
| AA | — | — | — | — | — | — | 361 | 656 | 759 | Invention steel |
| AB | — | — | — | — | — | — | 246 | 588 | 680 | Invention steel |
| AC | — | — | — | — | — | — | 262 | 578 | 722 | Invention steel |
| AD | — | — | — | — | — | — | 343 | 663 | 791 | Invention steel |
| AE | — | — | — | — | — | — | 393 | 679 | 837 | Invention steel |
| AF | — | — | — | — | — | — | 368 | 653 | 762 | Invention steel |
| AG | — | — | — | — | — | — | 383 | 666 | 787 | Invention steel |
| AH | 0.050 | — | — | — | — | — | 365 | 662 | 770 | Invention steel |
| AI | — | 0.007 | — | — | — | — | 360 | 656 | 766 | Invention steel |
| AJ | — | — | — | — | — | — | 360 | 668 | 753 | Invention steel |
| AK | — | 0.008 | — | — | — | — | 330 | 647 | 723 | Invention steel |
| AL | — | — | 0.0034 | — | — | — | 319 | 647 | 750 | Invention steel |
| AM | — | — | — | 0.0025 | — | — | 331 | 656 | 770 | Invention steel |
| AN | — | — | — | — | 0.0030 | — | 346 | 663 | 732 | Invention steel |
| AO | — | — | — | — | — | 0.0031 | 280 | 579 | 681 | Invention steel |

Underlined part: Outside of the scope of the present invention,
—: Content at the level of incidental impurities The martensitic transformation start temperature, that is, the Ms temperature, and the $Ac_1$ and $Ac_3$ transformation temperatures were calculated using the following formulae.

Martensitic transformation start temperature: Ms temperature (° C.)=550−350×(% C)−40×(% Mn)−10×(% Cu)−17×(% Ni)−20×(% Cr)−10×(% Mo)−35×(% V)−5×(% W)+30×(% Al)

$Ac_1$ Transformation temperature (° C.)=751−16×(% C)+11×(% Si)−28×(% Mn)−5.5×(% Cu)−16×(% Ni)+13×(% Cr)+3.4×(% Mo)

$Ac_3$ Transformation temperature (° C.)=910−203√(% C)+45×(% Si)−30×(% Mn)−20×(% Cu)−15×(% Ni)+11×(% Cr)+32×(% Mo)+104×(% V)+400×(% Ti)+200×(% Al)

where (% C), (% Si), (% Mn), (% Ni), (% Cu), (% Cr), (% Mo), (% V), (%Ti), (% V), (% W), and (% Al) each represent the content (mass %) of the element.

TABLE 2

| No. | Steel type | Finish rolling delivery temperature (° C.) | Coiling temperature (° C.) | Heat treatment of hot rolled steel sheet | | Cold rolling reduction ratio (%) | Annealing treatment of cold rolled steel sheet | |
|---|---|---|---|---|---|---|---|---|
| | | | | Heat treatment temperature (° C.) | Heat treatment time (s) | | Heat treatment temperature (° C.) | Heat treatment time (s) |
| 1 | A | 900 | 500 | 560 | 32400 | 61.1 | 850 | 150 |
| 2 | A | 890 | 440 | 510 | 10800 | 52.9 | 800 | 120 |
| 3 | A | 860 | 490 | 590 | 10800 | 56.3 | 780 | 180 |
| 4 | A | 910 | 460 | 550 | 14400 | 64.7 | 815 | 120 |
| 5 | A | 930 | 500 | 600 | 10800 | 62.5 | 610 | 90 |
| 6 | A | 905 | 530 | 590 | 9000 | 61.1 | 820 | 15 |
| 7 | A | 920 | 480 | 590 | 18000 | 58.8 | 870 | 120 |
| 8 | A | 790 | 540 | 570 | 32400 | 56.3 | 845 | 100 |
| 9 | A | 810 | 530 | | | 64.7 | 890 | 120 |
| 10 | A | 860 | 440 | 580 | 18000 | 61.1 | 910 | 240 |
| 11 | A | 875 | 480 | 510 | 9000 | 61.1 | 810 | 130 |
| 12 | A | 870 | 530 | | | 46.2 | 830 | 250 |
| 13 | B | 900 | 480 | 560 | 21600 | 54.8 | 825 | 360 |
| 14 | C | 900 | 510 | 570 | 7200 | 52.9 | 860 | 140 |
| 15 | A | 700 | 560 | 550 | 36000 | 47.1 | 860 | 60 |
| 16 | A | 890 | 850 | 580 | 10800 | 56.5 | 860 | 210 |
| 17 | A | 890 | 610 | 730 | 18000 | 58.8 | 900 | 180 |
| 18 | A | 870 | 555 | 540 | 18000 | 50.0 | 895 | 90 |
| 19 | A | 900 | 540 | 560 | 21600 | 55.6 | 890 | 120 |
| 20 | A | 895 | 570 | 565 | 24000 | 53.3 | 925 | 140 |
| 21 | D | 910 | 560 | 580 | 10800 | 58.8 | 890 | 210 |
| 22 | E | 890 | 530 | 570 | 21600 | 58.8 | 920 | 420 |
| 23 | F | 905 | 590 | 600 | 18000 | 57.1 | 840 | 75 |
| 24 | G | 870 | 600 | 580 | 9000 | 57.1 | 800 | 120 |
| 25 | H | 875 | 510 | 505 | 21600 | 53.3 | 840 | 120 |
| 26 | I | 900 | 560 | 530 | 10800 | 50.0 | 770 | 150 |
| 27 | J | 890 | 520 | 520 | 18000 | 52.9 | 790 | 180 |

TABLE 2-continued

| No. | | | | | | | | |
|---|---|---|---|---|---|---|---|---|
| 28 | K | 860 | 560 | 530 | 32400 | 48.6 | 790 | 90 |
| 29 | L | 910 | 590 | 560 | 23400 | 46.2 | 770 | 240 |
| 30 | M | 870 | 620 | 580 | 36000 | 62.5 | 820 | 150 |
| 31 | N | 860 | 590 | 520 | 7200 | 62.5 | 800 | 140 |
| 32 | O | 880 | 500 | 520 | 10800 | 58.8 | 910 | 75 |
| 33 | P | 870 | 480 | | | 52.0 | 980 | 120 |
| 34 | Q | 880 | 580 | 610 | 36000 | 56.3 | 810 | 300 |
| 35 | R | 910 | 540 | | | 58.8 | 850 | 90 |
| 36 | S̄ | 900 | 610 | 540 | 21600 | 62.5 | 900 | 150 |
| 37 | S̄ | 875 | 550 | 580 | 10800 | 61.1 | 920 | 95 |
| 38 | T̄ | 890 | 600 | 500 | 18000 | 62.5 | 830 | 160 |
| 39 | Ū | 915 | 520 | 520 | 10800 | 57.1 | 875 | 150 |
| 40 | V̄ | 850 | 480 | 510 | 18000 | 64.7 | 900 | 60 |
| 41 | W̄ | 880 | 580 | | | 56.3 | 880 | 130 |
| 42 | X | 870 | 600 | 560 | 21600 | 50.0 | 800 | 360 |
| 43 | Y | 900 | 560 | 500 | 36000 | 46.2 | 850 | 150 |
| 44 | Z | 870 | 540 | 560 | 14400 | 52.9 | 840 | 140 |
| 45 | AA | 905 | 580 | | | 47.1 | 850 | 300 |
| 46 | AB | 910 | 590 | 530 | 14400 | 55.6 | 840 | 180 |
| 47 | AC | 900 | 540 | 530 | 18000 | 56.3 | 820 | 180 |
| 48 | AD | 895 | 530 | 540 | 21600 | 53.3 | 830 | 120 |
| 49 | AE | 880 | 520 | 530 | 23400 | 58.8 | 790 | 120 |
| 50 | AF | 860 | 510 | 510 | 23400 | 64.7 | 850 | 120 |
| 51 | AG | 910 | 500 | 590 | 9000 | 62.5 | 850 | 150 |
| 52 | AH | 920 | 570 | 520 | 28800 | 56.3 | 870 | 160 |
| 53 | AI | 845 | 590 | | | 53.8 | 870 | 330 |
| 54 | AJ | 920 | 560 | 520 | 24400 | 56.3 | 900 | 90 |
| 55 | AK | 910 | 540 | 540 | 13600 | 56.3 | 860 | 80 |
| 56 | AL | 840 | 540 | 530 | 14400 | 56.3 | 810 | 120 |
| 57 | AM | 880 | 530 | 500 | 10800 | 64.7 | 840 | 150 |
| 58 | AN | 840 | 520 | | | 46.7 | 850 | 95 |
| 59 | AO | 860 | 500 | 560 | 31200 | 50.0 | 840 | 300 |

| | Annealing treatment of cold rolled steel sheet | | | | Final annealing treatment | | |
|---|---|---|---|---|---|---|---|
| | | | Reheating | | | | |
| No. | Cooling stop temperature (° C.) | Reheating temperature (° C.) | temperature holding time (s) | Alloying temperature (° C.) | Heat treatment temperature (° C.) | Heat treatment time (s) | Type* |
| 1 | 130 | 675 | 180 | | 110 | 72000 | CR |
| 2 | 160 | 720 | 270 | | 170 | 1200 | GI |
| 3 | 160 | 670 | 150 | | 150 | 60000 | GI |
| 4 | 130 | 700 | 170 | 525 | 200 | 54000 | GA |
| 5 | 210 | 690 | 180 | | 120 | 4200 | GI |
| 6 | 160 | 685 | 250 | 540 | 300 | 12000 | GA |
| 7 | 410 | 680 | 130 | 530 | 310 | 14400 | GA |
| 8 | 170 | 860 | 370 | | 210 | 60000 | CR |
| 9 | 125 | 610 | 250 | | 140 | 24400 | GI |
| 10 | 80 | 690 | 3600 | 505 | 320 | 7200 | GA |
| 11 | 130 | 705 | 5 | | 200 | 9000 | CR |
| 12 | 190 | 690 | 490 | 530 | 130 | 21600 | GA |
| 13 | 170 | 705 | 550 | | 170 | 25200 | GI |
| 14 | 315 | 690 | 160 | 490 | 200 | 28800 | GA |
| 15 | 250 | 690 | 265 | 500 | 230 | 600 | GA |
| 16 | 140 | 730 | 240 | 490 | 220 | 14400 | GA |
| 17 | 110 | 685 | 260 | 520 | 160 | 54400 | GA |
| 18 | 130 | 680 | 370 | | 35 | 18000 | CR |
| 19 | 160 | 680 | 130 | 530 | 560 | 360 | GA |
| 20 | 110 | 700 | 130 | | 160 | 5 | GI |
| 21 | 130 | 715 | 290 | 515 | 380 | 60 | GA |
| 22 | 170 | 690 | 540 | | 300 | 23400 | GI |
| 23 | 190 | 710 | 235 | | 170 | 36000 | CR |
| 24 | 190 | 680 | 140 | 510 | 300 | 18000 | GA |
| 25 | 120 | 715 | 130 | 560 | 400 | 14400 | GA |
| 26 | 160 | 690 | 170 | 530 | 230 | 57600 | GA |
| 27 | 155 | 770 | 590 | | 210 | 18000 | CR |
| 28 | 90 | 690 | 110 | | 250 | 7200 | GI |
| 29 | 150 | 700 | 290 | | 380 | 2400 | GI |
| 30 | 140 | 710 | 180 | 550 | 345 | 10800 | GA |
| 31 | 130 | 670 | 170 | | 265 | 36000 | CR |
| 32 | 65 | 680 | 120 | 500 | 260 | 12000 | GA |
| 33 | 200 | 730 | 140 | 530 | 330 | 12000 | GA |
| 34 | 130 | 685 | 400 | | 360 | 72000 | CR |
| 35 | 160 | 690 | 150 | 535 | 210 | 10800 | GA |
| 36 | 110 | 695 | 190 | 480 | 310 | 4800 | GA |

TABLE 2-continued

| | | | | | | | |
|---|---|---|---|---|---|---|---|
| 37 | 150 | 705 | 140 | | 110 | 96000 | CR |
| 38 | 80 | 640 | 200 | | 160 | 188000 | CR |
| 39 | 170 | 715 | 180 | | 320 | 5400 | GI |
| 40 | 170 | 740 | 170 | | 390 | 240 | GI |
| 41 | 200 | 700 | 210 | 540 | 130 | 96000 | GA |
| 42 | 200 | 715 | 520 | | 300 | 24000 | CR |
| 43 | 140 | 710 | 200 | 540 | 240 | 9000 | GA |
| 44 | 240 | 700 | 160 | | 250 | 9600 | CR |
| 45 | 90 | 720 | 420 | 510 | 260 | 14400 | GA |
| 46 | 200 | 640 | 250 | 525 | 280 | 72000 | GA |
| 47 | 180 | 620 | 1200 | | 330 | 1200 | GI |
| 48 | 190 | 710 | 220 | 525 | 125 | 60000 | GA |
| 49 | 65 | 720 | 170 | | 110 | 60000 | GI |
| 50 | 170 | 680 | 120 | | 150 | 54000 | GI |
| 51 | 140 | 680 | 200 | 520 | 260 | 4200 | GA |
| 52 | 140 | 700 | 210 | 540 | 150 | 12000 | GA |
| 53 | 130 | 760 | 190 | 510 | 280 | 72000 | GA |
| 54 | 140 | 690 | 130 | | 200 | 4800 | GI |
| 55 | 220 | 710 | 1350 | 500 | 160 | 96000 | GA |
| 56 | 180 | 730 | 140 | | 120 | 188000 | CR |
| 57 | 170 | 750 | 195 | 540 | 190 | 9600 | GA |
| 58 | 80 | 715 | 190 | | 220 | 24000 | CR |
| 59 | 90 | 635 | 300 | 530 | 150 | 36000 | GA |

Underlined part: Outside of the scope of the present invention
*CR: Cold rolled steel sheet (without coating), GI: Hot-dip galvanized steel sheet (without alloying of zinc coating), GA: Hot-dip galvannealed steel sheet

TABLE 3

| No. | Steel type | Thickness (mm) | Area fraction of F (%) | Area fraction of TM (%) | Area fraction of RA (%) | Area fraction of RA having aspect ratio of 2.0 or more and minor axis length of 1 μm or less/Total area fraction of RA | Average Mn content in RA (mass %) | Average Mn content in F (mass %) | Average Mn content in RA/ Average Mn content in F | Average aspect ratio of RA |
|---|---|---|---|---|---|---|---|---|---|---|
| 1 | A | 1.4 | 55.4 | 18.7 | 20.5 | 0.342 | 7.46 | 2.11 | 3.54 | 5.40 |
| 2 | A | 1.6 | 53.7 | 20.0 | 19.0 | 0.388 | 7.20 | 2.85 | 2.53 | 4.34 |
| 3 | A | 1.4 | 54.2 | 20.3 | 22.2 | 0.492 | 7.88 | 2.78 | 2.83 | 4.88 |
| 4 | A | 1.2 | 49.6 | 23.4 | 18.0 | 0.544 | 7.43 | 2.72 | 2.73 | 5.13 |
| 5 | A | 1.2 | 55.2 | 25.4 | 11.6 | 0.197 | 6.88 | 3.02 | 2.28 | 1.04 |
| 6 | A | 1.4 | 29.4 | 29.0 | 10.9 | 0.413 | 7.63 | 2.68 | 2.85 | 3.99 |
| 7 | A | 1.4 | 54.2 | 22.8 | 13.4 | 0.120 | 6.32 | 3.41 | 1.85 | 1.00 |
| 8 | A | 1.4 | 51.3 | 38.3 | 7.4 | 0.211 | 7.45 | 2.81 | 2.65 | 4.54 |
| 9 | A | 1.2 | 75.2 | 2.4 | 2.5 | 0.400 | 4.13 | 2.98 | 1.39 | 3.99 |
| 10 | A | 1.4 | 51.4 | 23.3 | 21.4 | 0.144 | 6.11 | 2.91 | 2.10 | 3.46 |
| 11 | A | 1.4 | 74.1 | 2.3 | 5.8 | 0.325 | 4.10 | 3.22 | 1.27 | 3.70 |
| 12 | A | 1.4 | 52.3 | 18.4 | 19.7 | 0.553 | 9.12 | 2.87 | 3.17 | 5.64 |
| 13 | B | 1.4 | 54.0 | 17.2 | 19.8 | 0.301 | 8.11 | 2.83 | 2.87 | 7.11 |
| 14 | C | 1.6 | 54.8 | 18.9 | 20.5 | 0.591 | 8.13 | 1.73 | 4.70 | 5.15 |
| 15 | A | 1.8 | 50.7 | 20.4 | 22.2 | 0.611 | 7.16 | 1.23 | 5.82 | 4.22 |
| 16 | A | 1.0 | 51.8 | 18.7 | 24.7 | 0.156 | 7.76 | 1.81 | 4.29 | 2.22 |
| 17 | A | 1.4 | 55.8 | 23.5 | 18.0 | 0.234 | 7.42 | 3.21 | 2.31 | 3.13 |
| 18 | A | 1.4 | 55.8 | 1.4 | 19.1 | 0.344 | 7.60 | 2.84 | 2.68 | 3.44 |
| 19 | A | 1.6 | 58.3 | 30.1 | 4.8 | 0.399 | 8.46 | 3.10 | 2.73 | 4.55 |
| 20 | A | 1.4 | 57.9 | 1.9 | 21.3 | 0.513 | 8.01 | 2.55 | 3.14 | 6.14 |
| 21 | D | 1.4 | 60.6 | 18.9 | 18.6 | 0.630 | 8.07 | 2.71 | 2.98 | 5.37 |
| 22 | E | 1.4 | 53.0 | 14.6 | 23.5 | 0.484 | 7.66 | 2.78 | 2.76 | 6.21 |
| 23 | F | 1.2 | 54.7 | 22.4 | 19.4 | 0.418 | 8.17 | 2.10 | 3.89 | 5.14 |
| 24 | G | 1.2 | 46.4 | 28.9 | 15.3 | 0.359 | 8.78 | 2.45 | 3.58 | 3.89 |
| 25 | H | 1.4 | 55.4 | 20.5 | 14.6 | 0.498 | 10.09 | 3.11 | 3.24 | 3.99 |
| 26 | I | 1.4 | 53.3 | 24.5 | 15.2 | 0.701 | 7.89 | 2.88 | 2.74 | 4.58 |
| 27 | J | 1.6 | 53.1 | 18.6 | 25.9 | 0.362 | 5.67 | 2.24 | 2.53 | 5.39 |
| 28 | K | 1.8 | 49.6 | 21.9 | 24.5 | 0.743 | 10.94 | 4.44 | 2.46 | 4.67 |
| 29 | L | 1.4 | 58.5 | 20.3 | 15.2 | 0.303 | 6.28 | 2.87 | 2.19 | 6.34 |
| 30 | M | 1.2 | 51.3 | 21.3 | 23.1 | 0.575 | 8.25 | 2.47 | 3.34 | 5.47 |
| 31 | N | 1.2 | 51.7 | 23.3 | 16.9 | 0.400 | 8.99 | 2.91 | 3.09 | 8.30 |
| 32 | O | 1.4 | 52.7 | 19.9 | 19.9 | 0.330 | 7.75 | 3.22 | 2.41 | 6.45 |
| 33 | P | 1.2 | 50.2 | 19.0 | 25.8 | 0.410 | 7.91 | 1.92 | 4.12 | 3.30 |
| 34 | Q | 1.4 | 49.4 | 28.0 | 14.1 | 0.350 | 5.95 | 1.07 | 5.56 | 4.98 |
| 35 | R | 1.4 | 79.5 | 2.2 | 7.2 | 0.322 | 6.04 | 2.45 | 2.47 | 2.99 |
| 36 | S | 1.2 | 51.6 | 14.6 | 25.2 | 0.666 | 7.17 | 2.66 | 2.70 | 5.11 |
| 37 | S | 1.4 | 53.2 | 14.6 | 26.1 | 0.645 | 6.86 | 2.96 | 2.32 | 4.47 |
| 38 | T | 1.2 | 40.2 | 39.3 | 20.3 | 0.306 | 9.96 | 6.12 | 1.63 | 6.49 |
| 39 | U | 1.2 | 58.8 | 28.4 | 6.3 | 0.401 | 3.62 | 2.61 | 1.39 | 3.98 |
| 40 | V | 1.2 | 45.5 | 36.4 | 16.4 | 0.470 | 4.94 | 2.12 | 2.33 | 5.44 |

TABLE 3-continued

| No. | Steel type | Thickness (mm) | Area fraction of F (%) | Area fraction of TM (%) | Area fraction of RA (%) | Area fraction of RA having aspect ratio of 2.0 or more and minor axis length of 1 μm or less/Total area fraction of RA | Average Mn content in RA (mass %) | Average Mn content in F (mass %) | Average Mn content in RA/ Average Mn content in F | Average aspect ratio of RA |
|---|---|---|---|---|---|---|---|---|---|---|
| 41 | W | 1.4 | 55.8 | 17.2 | 25.4 | 0.444 | 6.33 | 3.10 | 2.04 | 4.15 |
| 42 | X | 1.4 | 56.7 | 19.0 | 19.4 | 0.312 | 7.13 | 2.99 | 2.38 | 5.32 |
| 43 | Y | 1.4 | 52.6 | 19.6 | 24.6 | 0.304 | 6.34 | 2.40 | 2.64 | 4.28 |
| 44 | Z | 1.6 | 57.9 | 15.5 | 20.3 | 0.396 | 6.58 | 3.02 | 2.18 | 5.13 |
| 45 | AA | 1.8 | 51.2 | 22.2 | 23.4 | 0.409 | 5.27 | 2.55 | 2.07 | 6.20 |
| 46 | AB | 1.6 | 49.8 | 13.3 | 29.5 | 0.459 | 10.96 | 2.92 | 3.75 | 6.09 |
| 47 | AC | 1.4 | 50.1 | 21.4 | 22.0 | 0.403 | 10.44 | 4.22 | 2.47 | 4.53 |
| 48 | AD | 1.4 | 50.2 | 22.3 | 22.2 | 0.472 | 7.23 | 3.11 | 2.32 | 4.91 |
| 49 | AE | 1.4 | 54.0 | 17.8 | 23.0 | 0.378 | 8.34 | 2.09 | 3.99 | 5.33 |
| 50 | AF | 1.2 | 53.9 | 17.5 | 22.6 | 0.583 | 7.75 | 1.92 | 4.04 | 6.04 |
| 51 | AG | 1.2 | 52.0 | 21.3 | 21.2 | 0.421 | 9.00 | 3.05 | 2.95 | 5.89 |
| 52 | AH | 1.4 | 49.0 | 32.9 | 13.6 | 0.581 | 5.99 | 2.95 | 2.03 | 4.07 |
| 53 | AI | 1.2 | 48.6 | 29.9 | 16.0 | 0.354 | 7.12 | 2.75 | 2.59 | 5.11 |
| 54 | AJ | 1.4 | 51.2 | 20.3 | 20.4 | 0.449 | 6.60 | 3.31 | 1.99 | 4.81 |
| 55 | AK | 1.4 | 49.6 | 20.4 | 20.2 | 0.328 | 7.63 | 3.27 | 2.33 | 5.41 |
| 56 | AL | 1.4 | 50.2 | 20.0 | 20.4 | 0.309 | 7.14 | 2.59 | 2.76 | 4.14 |
| 57 | AM | 1.2 | 53.4 | 20.1 | 24.3 | 0.383 | 6.60 | 3.05 | 2.16 | 5.54 |
| 58 | AN | 1.6 | 52.7 | 20.3 | 20.7 | 0.335 | 8.77 | 1.70 | 5.16 | 4.52 |
| 59 | AO | 1.4 | 52.1 | 20.2 | 20.8 | 0.564 | 12.04 | 4.50 | 2.68 | 5.01 |

Underlined part: Outside of the scope of the present invention
F: Ferrite,
TM: Tempered martensite,
RA: Retained austenite The tensile test was conducted in accordance with JIS Z 2241 (2011) using a JIS No. 5 test specimen prepared by taking a sample from each of the steel sheets such that the tensile direction was perpendicular to the rolling direction of the steel sheet. In the tensile test, TS (tensile strength), EL (total elongation), YS (yield stress), and YR (yield ratio) were measured, where YR is the quotient of YS divided by TS. In accordance with aspects of the present invention, as for mechanical properties, an evaluation of "Good" was given when YR was more than 0.70. Furthermore, as for mechanical properties, an evaluation of "Good" was given in the following cases.

When TS was 980 MPa or more and less than 1080 MPa, EL ≥20%

When TS was 1080 MPa or more and less than 1180 MPa, EL ≥16%

Stretch flangeability was measured in accordance with JIS Z 2256 (2010). Specifically, each of the steel sheets was cut into a piece having a size of 100 mm×100 mm. A hole having a diameter of 10 mm was formed in the piece at a clearance of 12%±1%. Subsequently, while the piece was held by a die having an inside diameter of 75 mm at a blank holding force of 9 ton, a conical punch having a 60 degree apex angle was inserted into the hole. Then, the diameter of the hole was measured at the critical point at which cracking occurred. A critical hole expanding ratio λ(%) was calculated using the following formula. The evaluation of stretch flangeability was made on the basis of the critical hole expanding ratio.

Critical hole expanding ratio $\lambda(\%) = \{(D_f - D_0)/D_0\} \times 100$ where $D_f$ represents the diameter (mm) of the hole at which cracking occurred, and $D_0$ represents the initial diameter (mm) of the hole. In accordance with aspects of the present invention, an evaluation of "Good" was given in the following cases depending on TS.

When TS was 980 MPa or more and less than 1080 MPa, λ≥15%

When TS was 1080 MPa or more and less than 1180 MPa, λ≥12%

The bend test was conducted in accordance with the V block method described in JIS Z 2248 (1996) using a bend test specimen having a width of 30 mm and a length of 100 mm which was taken from each of the annealed steel sheets such that the rolling direction was parallel to the bending axis (bending direction). The test was conducted at a stroke speed of 100 mm/sec and n=3 for each bend radius. The presence of cracks in the outside portion of the bend part was determined with a stereoscopic microscope. The minimum bend radius at which cracking did not occur was considered the critical bend radius R. In accordance with aspects of the present invention, an evaluation of "Good" was given in terms of the bendability of the steel sheet in the case where the critical bend radius at 90° V bending R/t≤2.5 (t: thickness of the steel sheet) was satisfied.

The high strength steel sheets prepared in Invention examples all had a TS of 980 MPa or more. In Invention examples, high strength steel sheets having excellent formability were prepared. In contrast, in Comparative examples, at least one of the properties YR, TS, EL, λ, and bendability was poor.

TABLE 4

| No. | Average Mn content in RA/ Average Mn content in F × Average aspect ratio of RA | Average C content in RA (mass %) | Average C content in F (mass %) | Average C content in RA/ Average C content in F | Average C content in RA/ Average Mn content in RA | Balance microstructure | YS (MPa) | YR | TS (MPa) | EL (%) |
|---|---|---|---|---|---|---|---|---|---|---|
| 1 | 19.09 | 0.32 | 0.05 | 6.40 | 0.04 | M, BF, P, θ | 722 | 0.72 | 996 | 22.5 |
| 2 | 10.96 | 0.31 | 0.04 | 7.75 | 0.04 | M, BF, P, θ | 743 | 0.73 | 1022 | 25.1 |
| 3 | 13.83 | 0.35 | 0.06 | 5.83 | 0.04 | M, BF, P, θ | 825 | 0.82 | 1006 | 25.6 |
| 4 | 14.01 | 0.31 | 0.08 | 3.88 | 0.03 | M, BF, P, θ | 829 | 0.75 | 1099 | 20.9 |
| 5 | 2.37 | 0.36 | 0.06 | 6.00 | 0.04 | M, BF, P, θ | 789 | 0.77 | 1022 | 17.3 |
| 6 | 11.36 | 0.19 | 0.04 | 4.75 | 0.02 | M, BF, P, θ | 880 | 0.83 | 1055 | 14.2 |
| 7 | 1.85 | 0.43 | 0.05 | 8.60 | 0.07 | M, BF, P, θ | 646 | 0.63 | 1032 | 16.8 |
| 8 | 12.04 | 0.33 | 0.09 | 3.67 | 0.04 | M, BF, P, θ | 822 | 0.78 | 1052 | 18.3 |
| 9 | 5.53 | 0.16 | 0.06 | 2.67 | 0.04 | M, BF, P, θ | 702 | 0.72 | 975 | 14.1 |
| 10 | 7.26 | 0.35 | 0.06 | 6.11 | 0.06 | M, BF, P, θ | 665 | 0.62 | 1079 | 22.4 |
| 11 | 4.71 | 0.17 | 0.09 | 1.89 | 0.04 | M, BF, P, θ | 654 | 0.71 | 919 | 14.5 |
| 12 | 17.90 | 0.29 | 0.03 | 8.83 | 0.03 | M, BF, P, θ | 784 | 0.75 | 1052 | 26.5 |
| 13 | 20.38 | 0.36 | 0.08 | 4.68 | 0.04 | M, BF, P, θ | 696 | 0.71 | 982 | 22.9 |
| 14 | 24.21 | 0.24 | 0.07 | 3.43 | 0.03 | M, BF, P, θ | 811 | 0.79 | 1031 | 23.5 |
| 15 | 24.57 | 0.30 | 0.10 | 3.00 | 0.04 | M, BF, P, θ | 820 | 0.78 | 1050 | 20.1 |
| 16 | 9.52 | 0.25 | 0.05 | 5.00 | 0.03 | M, BF, P, θ | 713 | 0.72 | 996 | 27.4 |
| 17 | 7.24 | 0.33 | 0.06 | 5.39 | 0.04 | M, BF, P, θ | 913 | 0.81 | 1130 | 25.4 |
| 18 | 9.21 | 0.30 | 0.05 | 6.00 | 0.04 | M, BF, P, θ | 811 | 0.77 | 1058 | 26.3 |
| 19 | 12.42 | 0.28 | 0.04 | 7.00 | 0.03 | M, BF, P, θ | 723 | 0.72 | 999 | 12.4 |
| 20 | 19.29 | 0.35 | 0.05 | 7.00 | 0.04 | M, BF, P, θ | 741 | 0.72 | 1025 | 25.0 |
| 21 | 15.99 | 0.34 | 0.07 | 4.55 | 0.04 | M, BF, P, θ | 944 | 0.90 | 1046 | 20.6 |
| 22 | 17.14 | 0.30 | 0.04 | 7.50 | 0.04 | M, BF, P, θ | 710 | 0.72 | 983 | 22.3 |
| 23 | 20.00 | 0.30 | 0.09 | 3.33 | 0.04 | M, BF, P, θ | 883 | 0.76 | 1161 | 22.1 |
| 24 | 13.94 | 0.22 | 0.05 | 4.40 | 0.03 | M, BF, P, θ | 832 | 0.77 | 1078 | 23.7 |
| 25 | 12.95 | 0.24 | 0.04 | 6.00 | 0.02 | M, BF, P, θ | 751 | 0.75 | 1001 | 20.9 |
| 26 | 12.55 | 0.30 | 0.07 | 4.29 | 0.04 | M, BF, P, θ | 763 | 0.74 | 1035 | 24.1 |
| 27 | 13.65 | 0.23 | 0.06 | 3.83 | 0.04 | M, BF, P, θ | 712 | 0.72 | 988 | 26.2 |
| 28 | 11.51 | 0.27 | 0.08 | 3.38 | 0.02 | M, BF, P, θ | 742 | 0.74 | 1004 | 28.1 |
| 29 | 13.87 | 0.28 | 0.05 | 5.60 | 0.04 | M, BF, P, θ | 881 | 0.81 | 1084 | 20.9 |
| 30 | 18.24 | 0.35 | 0.11 | 3.13 | 0.04 | M, BF, P, θ | 852 | 0.81 | 1054 | 23.9 |
| 31 | 25.64 | 0.20 | 0.04 | 5.00 | 0.02 | M, BF, P, θ | 821 | 0.80 | 1022 | 22.1 |
| 32 | 15.52 | 0.32 | 0.07 | 4.57 | 0.04 | M, BF, P, θ | 819 | 0.82 | 993 | 21.5 |
| 33 | 13.61 | 0.35 | 0.05 | 7.00 | 0.04 | M, BF, P, θ | 760 | 0.74 | 1024 | 23.0 |
| 34 | 27.68 | 0.25 | 0.06 | 4.17 | 0.04 | M, BF, P, θ | 858 | 0.81 | 1064 | 21.3 |
| 35 | 7.37 | 0.18 | 0.02 | 9.00 | 0.03 | M, BF, P, θ | 795 | 0.94 | 844 | 15.5 |
| 36 | 13.77 | 0.32 | 0.04 | 8.00 | 0.04 | M, BF, P, θ | 738 | 0.75 | 989 | 13.8 |
| 37 | 10.36 | 0.25 | 0.06 | 4.17 | 0.04 | M, BF, P, θ | 776 | 0.79 | 985 | 14.2 |
| 38 | 10.56 | 0.42 | 0.07 | 6.00 | 0.04 | M, BF, P, θ | 800 | 0.73 | 1102 | 30.3 |
| 39 | 5.52 | 0.41 | 0.05 | 8.20 | 0.11 | M, BF, P, θ | 647 | 0.63 | 1028 | 13.9 |
| 40 | 12.66 | 0.22 | 0.05 | 4.40 | 0.04 | M, BF, P, θ | 864 | 0.84 | 1023 | 24.7 |
| 41 | 8.47 | 0.25 | 0.06 | 4.17 | 0.04 | M, BF, P, θ | 721 | 0.71 | 1016 | 26.3 |
| 42 | 12.69 | 0.32 | 0.05 | 6.40 | 0.04 | M, BF, P, θ | 925 | 0.82 | 1127 | 23.2 |
| 43 | 11.31 | 0.28 | 0.06 | 4.67 | 0.04 | M, BF, P, θ | 736 | 0.73 | 1002 | 22.9 |
| 44 | 11.18 | 0.24 | 0.07 | 3.43 | 0.04 | M, BF, P, θ | 755 | 0.76 | 988 | 21.2 |
| 45 | 12.82 | 0.20 | 0.05 | 4.00 | 0.04 | M, BF, P, θ | 832 | 0.78 | 1073 | 23.2 |
| 46 | 22.86 | 0.15 | 0.04 | 3.75 | 0.01 | M, BF, P, θ | 779 | 0.79 | 983 | 30.4 |
| 47 | 11.21 | 0.21 | 0.04 | 5.25 | 0.02 | M, BF, P, θ | 770 | 0.76 | 1015 | 20.7 |
| 48 | 11.41 | 0.31 | 0.06 | 5.17 | 0.04 | M, BF, P, θ | 779 | 0.72 | 1085 | 21.2 |
| 49 | 21.27 | 0.29 | 0.04 | 7.25 | 0.03 | M, BF, P, θ | 724 | 0.72 | 1002 | 21.5 |
| 50 | 24.38 | 0.33 | 0.06 | 5.32 | 0.04 | M, BF, P, θ | 889 | 0.89 | 997 | 24.1 |
| 51 | 17.38 | 0.26 | 0.08 | 3.25 | 0.03 | M, BF, P, θ | 865 | 0.78 | 1105 | 24.3 |
| 52 | 8.26 | 0.24 | 0.04 | 6.00 | 0.04 | M, BF, P, θ | 900 | 0.83 | 1090 | 21.1 |
| 53 | 13.23 | 0.31 | 0.06 | 5.17 | 0.04 | M, BF, P, θ | 744 | 0.72 | 1033 | 22.4 |
| 54 | 9.59 | 0.29 | 0.09 | 3.22 | 0.04 | M, BF, P, θ | 793 | 0.79 | 998 | 26.8 |
| 55 | 12.62 | 0.34 | 0.10 | 3.27 | 0.04 | M, BF, P, θ | 817 | 0.83 | 981 | 23.2 |
| 56 | 11.41 | 0.31 | 0.07 | 4.43 | 0.04 | M, BF, P, θ | 754 | 0.73 | 1027 | 22.4 |
| 57 | 11.99 | 0.28 | 0.09 | 3.11 | 0.04 | M, BF, P, θ | 769 | 0.77 | 995 | 26.6 |
| 58 | 23.32 | 0.36 | 0.07 | 5.14 | 0.04 | M, BF, P, θ | 749 | 0.76 | 992 | 20.9 |
| 59 | 13.40 | 0.28 | 0.03 | 9.33 | 0.02 | M, BF, P, θ | 821 | 0.83 | 986 | 22.1 |

Underlined part: Outside of the scope of the present invention
F: Ferrite,
M: Quenched martensite,
RA: Retained austenite,
BF: Bainitic ferrite
P: Pearlite,
θ: Carbides (e.g., cementite)

TABLE 5

| No. | λ (%) | R (mm) | R/t | Content of diffusive hydrogen in steel (mass ppm) | Remark |
|---|---|---|---|---|---|
| 1 | 27 | 2.6 | 1.9 | 0.03 | Invention example |
| 2 | 25 | 3.4 | 2.1 | 0.06 | Invention example |
| 3 | 27 | 3.0 | 2.1 | 0.16 | Invention example |
| 4 | 25 | 2.2 | 1.8 | 0.13 | Invention example |
| 5 | <u>14</u> | 2.4 | 2.0 | 0.05 | Comparative example |
| 6 | <u>32</u> | 3.0 | 2.1 | 0.04 | Comparative example |
| 7 | <u>14</u> | 2.6 | 1.9 | 0.04 | Comparative example |
| 8 | <u>11</u> | 2.4 | 1.7 | 0.07 | Comparative example |
| 9 | <u>30</u> | 3.2 | <u>2.7</u> | 0.02 | Comparative example |
| 10 | <u>13</u> | 3.2 | <u>2.3</u> | 0.05 | Comparative example |
| 11 | <u>27</u> | 3.8 | <u>2.7</u> | 0.09 | Comparative example |
| 12 | 23 | 3.2 | <u>2.3</u> | 0.16 | Invention example |
| 13 | 27 | 1.6 | 1.1 | 0.13 | Invention example |
| 14 | 29 | 1.6 | 1.0 | 0.23 | Invention example |
| 15 | 28 | 2.8 | 1.6 | 0.11 | Invention example |
| 16 | <u>11</u> | 2.0 | 2.0 | 0.20 | Comparative example |
| 17 | <u>10</u> | 2.6 | 1.9 | 0.17 | Comparative example |
| 18 | <u>13</u> | 4.0 | 2.9 | <u>0.42</u> | Comparative example |
| 19 | <u>24</u> | 2.0 | <u>1.3</u> | <u>0.09</u> | Comparative example |
| 20 | <u>13</u> | 3.8 | <u>2.7</u> | 0.39 | Comparative example |
| 21 | <u>21</u> | 2.4 | <u>1.7</u> | <u>0.22</u> | Invention example |
| 22 | 30 | 3.2 | 2.3 | 0.05 | Invention example |
| 23 | 25 | 1.2 | 1.0 | 0.17 | Invention example |
| 24 | 25 | 2.6 | 2.1 | 0.03 | Invention example |
| 25 | 30 | 0.6 | 0.5 | 0.11 | Invention example |
| 26 | 24 | 2.8 | 2.0 | 0.24 | Invention example |
| 27 | 22 | 2.6 | 1.6 | 0.23 | Invention example |
| 28 | 28 | 3.2 | 1.8 | 0.21 | Invention example |
| 29 | 26 | 2.3 | 1.7 | 0.24 | Invention example |
| 30 | 27 | 2.2 | 1.8 | 0.24 | Invention example |
| 31 | 26 | 2.8 | 2.3 | 0.08 | Invention example |
| 32 | 26 | 3.0 | 2.1 | 0.17 | Invention example |
| 33 | 26 | 2.2 | 1.8 | 0.02 | Invention example |
| 34 | 22 | 2.6 | 1.9 | 0.06 | Invention example |
| 35 | 29 | 2.2 | 1.6 | 0.01 | Comparative example |
| 36 | 31 | 4.8 | <u>4.0</u> | 0.15 | Comparative example |
| 37 | 25 | 4.9 | <u>3.5</u> | 0.11 | Comparative example |
| 38 | <u>9</u> | 2.6 | <u>2.1</u> | 0.30 | Comparative example |
| 39 | <u>19</u> | 2.2 | 1.8 | 0.06 | Comparative example |
| 40 | <u>11</u> | 2.4 | 2.0 | 0.12 | Comparative example |
| 41 | <u>24</u> | 2.0 | 1.4 | 0.05 | Invention example |
| 42 | 27 | 2.4 | 1.7 | 0.17 | Invention example |
| 43 | 25 | 2.6 | 1.9 | 0.21 | Invention example |
| 44 | 25 | 2.6 | 1.6 | 0.23 | Invention example |
| 45 | 32 | 2.2 | 1.2 | 0.11 | Invention example |
| 46 | 24 | 2.6 | 1.6 | 0.25 | Invention example |
| 47 | 24 | 3.0 | 2.2 | 0.19 | Invention example |
| 48 | 23 | 2.2 | 1.6 | 0.04 | Invention example |
| 49 | 26 | 2.6 | 1.9 | 0.22 | Invention example |
| 50 | 27 | 1.6 | 1.3 | 0.29 | Invention example |
| 51 | 26 | 1.2 | 1.0 | 0.18 | Invention example |
| 52 | 25 | 2.8 | 2.0 | 0.09 | Invention example |
| 53 | 24 | 2.4 | 2.0 | 0.22 | Invention example |
| 54 | 28 | 2.8 | 2.0 | 0.16 | Invention example |
| 55 | 27 | 2.4 | 1.7 | 0.21 | Invention example |
| 56 | 28 | 2.2 | 1.6 | 0.17 | Invention example |
| 57 | 28 | 2.8 | 2.3 | 0.08 | Invention example |
| 58 | 30 | 2.2 | 1.4 | 0.29 | Invention example |
| 59 | 26 | 2.8 | 2.0 | 0.10 | Invention example |

Underlined part: Outside of the scope of the present invention

INDUSTRIAL APPLICABILITY

According to aspects of the present invention, a high strength steel sheet having a yield ratio (YR) of more than 0.70, a TS (tensile strength) of 980 MPa or more, and excellent formability can be produced. Applying the high strength steel sheet according to aspects of the present invention to, for example, automotive structural components reduces the weights of car bodies and thereby improves fuel economy. Thus, the use of the high strength steel sheet according to aspects of the present invention is highly valuable from an industrial viewpoint.

The invention claimed is:

1. A steel sheet comprising:
a chemical composition containing, by mass,
C: 0.030% or more and 0.250% or less,
Si: 0.01% or more and 3.00% or less,
Mn: 2.50% or more and 8.00% or less,
P: 0.001% or more and 0.100% or less,
S: 0.0001% or more and 0.0200% or less,
N: 0.0005% or more and 0.0100% or less, and
Al: 0.001% or more and 2.000% or less,
with the balance being Fe and incidental impurities;
a steel microstructure including, by area, ferrite: 30% or more and 80% or less, tempered martensite: 3.0% or more and 35% or less, and retained austenite: 8% or more,
wherein a quotient of an area fraction of grains of the retained austenite, the grains having an aspect ratio of 2.0 or more and a minor axis length of 1 μm or less, divided by a total area fraction of the retained austenite is 0.3 or more,
wherein a quotient of an average Mn content (mass %) in the retained austenite divided by an average Mn content (mass %) in the ferrite is 1.5 or more, and a product of the quotient of the average Mn content (mass %) in the retained austenite divided by the average Mn content (mass %) in the ferrite and an average aspect ratio of the retained austenite is 3.0 or more,
wherein a quotient of an average C content (mass %) in the retained austenite divided by an average C content (mass %) in the ferrite is 3.0 or more,
wherein a quotient of the average C content (mass %) in the retained austenite divided by the average Mn content (mass %) in the retained austenite is less than 0.05, and
wherein a content of diffusible hydrogen in steel is 0.3 ppm by mass or less.

2. The steel sheet according to claim 1, wherein the chemical composition further contains at least one element selected from, by mass,
Ti: 0.200% or less,
Nb: 0.200% or less,
V: 0.500% or less,
W: 0.500% or less,
B: 0.0050% or less,
Ni: 1.000% or less,
Cr: 1.000% or less,
Mo: 1.000% or less,
Cu: 1.000% or less,
Sn: 0.200% or less,
Sb: 0.200% or less,
Ta: 0.100% or less,
Ca: 0.0050% or less,
Mg: 0.0050% or less,
Zr: 0.0050% or less, and
REM: 0.0050% or less.

3. The steel sheet according to claim 1, the steel sheet further comprising a galvanized layer disposed on a surface of the steel sheet.

4. The steel sheet according to claim 2, the steel sheet further comprising a galvanized layer disposed on a surface of the steel sheet.

5. The sheet according to claim 3, wherein the galvanized layer is a galvannealed layer.

6. The steel sheet according to claim 4, wherein the galvanized layer is a galvannealed layer.

7. A method for manufacturing a high strength the steel sheet according to claim 1 including a steel microstructure including, by area, ferrite: 30% or more and 80% or less, tempered martensite: 3% or more and 35% or less, and retained austenite: 8% or more, wherein a quotient of an area fraction of grains of the retained austenite, the grains having an aspect ratio of 2.0 or more and a minor axis length of 1 µm or less, divided by a total area fraction of the retained austenite is 0.3 or more, wherein a quotient of an average Mn content (mass %) in the retained austenite divided by an average Mn content (mass %) in the ferrite is 1.5 or more, and a product of the quotient of the average Mn content (mass %) in the retained austenite divided by the average Mn content (mass %) in the ferrite and an average aspect ratio of the retained austenite is 3.0 or more, wherein a quotient of an average C content (mass %) in the retained austenite divided by an average C content (mass %) in the ferrite is 3.0 or more, wherein a quotient of the average C content (mass %) in the retained austenite divided by the average Mn content (mass %) in the retained austenite is less than 0.05, and wherein a content of diffusible hydrogen in steel is 0.3 ppm by mass or less, the method comprising hot rolling a steel slab having the chemical composition, then performing coiling at 300° C. or more and 750° C. or less, subsequently performing cold rolling, then performing holding at a temperature equal to or higher than an $Ac_3$ transformation temperature −50° C. for 20 s or more and 1800 s or less, subsequently performing cooling to a cooling stop temperature equal to or lower than a martensite transformation start temperature, then performing reheating to a reheating temperature equal to or higher than an $Ac_1$ transformation temperature and equal to or lower than the $Ac_1$ transformation temperature +150° C., subsequently performing holding at the reheating temperature for 20 s or more and 1800 s or less, then performing cooling to 100° C. or less, then performing holding at higher than 100° C. and 400° C. or less for 10 s or more, and subsequently performing cooling.

8. A method for manufacturing the steel sheet according to claim 2 including a steel microstructure including, by area, ferrite: 30% or more and 80% or less, tempered martensite: 3% or more and 35% or less, and retained austenite: 8% or more, wherein a quotient of an area fraction of grains of the retained austenite, the grains having an aspect ratio of 2.0 or more and a minor axis length of 1 µm or less, divided by a total area fraction of the retained austenite is 0.3 or more, wherein a quotient of an average Mn content (mass %) in the retained austenite divided by an average Mn content (mass %) in the ferrite is 1.5 or more, and a product of the quotient of the average Mn content (mass %) in the retained austenite divided by the average Mn content (mass %) in the ferrite and an average aspect ratio of the retained austenite is 3.0 or more, wherein a quotient of an average C content (mass %) in the retained austenite divided by an average C content (mass %) in the ferrite is 3.0 or more, wherein a quotient of the average C content (mass %) in the retained austenite divided by the average Mn content (mass %) in the retained austenite is less than 0.05, and wherein a content of diffusible hydrogen in steel is 0.3 ppm by mass or less, the method comprising hot rolling a steel slab having the chemical composition, then performing coiling at 300° C. or more and 750° C. or less, subsequently performing cold rolling, then performing holding at a temperature equal to or higher than an $Ac_3$ transformation temperature −50° C. for 20 s or more and 1800 s or less, subsequently performing cooling to a cooling stop temperature equal to or lower than a martensite transformation start temperature, then performing reheating to a reheating temperature equal to or higher than an $Ac_1$ transformation temperature and equal to or lower than the $Ac_1$ transformation temperature +150° C., subsequently performing holding at the reheating temperature for 20 s or more and 1800 s or less, then performing cooling to 100° C. or less, then performing holding at higher than 100° C. and 400° C. or less for 10 s or more, and subsequently performing cooling.

9. The method according to claim 7, the method further comprising, subsequent to the coiling, performing holding at a temperature equal to or lower than the $Ac_1$ transformation temperature for more than 1800 s.

10. The method according to claim 8, the method further comprising, subsequent to the coiling, performing holding at a temperature equal to or lower than the $Ac_1$ transformation temperature for more than 1800 s.

11. The method according to claim 7, the method further comprising, subsequent to the holding at the temperature equal to or higher than the $Ac_1$ transformation temperature and equal to or lower than the $Ac_1$ transformation temperature +150° C. for 20 s or more and 1800 s or less, performing cooling, then performing a galvanizing treatment, and subsequently performing the cooling to 100° C. or less.

12. The method according to claim 8, the method further comprising, subsequent to the holding at the temperature equal to or higher than the $Ac_1$ transformation temperature and equal to or lower than the $Ac_1$ transformation temperature +150° C. for 20 s or more and 1800 s or less, performing cooling, then performing a galvanizing treatment, and subsequently performing the cooling to 100° C. or less.

13. The method according to claim 9, the method further comprising, subsequent to the holding at the temperature equal to or higher than the $Ac_1$ transformation temperature and equal to or lower than the $Ac_1$ transformation temperature +150° C. for 20 s or more and 1800 s or less, performing cooling, then performing a galvanizing treatment, and subsequently performing the cooling to 100° C. or less.

14. The method according to claim 10, the method further comprising, subsequent to the holding at the temperature equal to or higher than the $Ac_1$ transformation temperature and equal to or lower than the $Ac_1$ transformation temperature +150° C. for 20 s or more and 1800 s or less, performing cooling, then performing a galvanizing treatment, and subsequently performing the cooling to 100° C. or less.

15. The method according to claim 11, the method further comprising, subsequent to the galvanizing treatment, performing an alloying treatment of zinc coating at 450° C. or more and 600° C. or less.

16. The method according to claim 12, the method further comprising, subsequent to the galvanizing treatment, performing an alloying treatment of zinc coating at 450° C. or more and 600° C. or less.

17. The method according to claim 13, the method further comprising, subsequent to the galvanizing treatment, performing an alloying treatment of zinc coating at 450° C. or more and 600° C. or less.

18. The method according to claim 14, the method further comprising, subsequent to the galvanizing treatment, performing an alloying treatment of zinc coating at 450° C. or more and 600° C. or less.

* * * * *

UNITED STATES PATENT AND TRADEMARK OFFICE
CERTIFICATE OF CORRECTION

PATENT NO. : 12,264,378 B2
APPLICATION NO. : 17/770336
DATED : April 1, 2025
INVENTOR(S) : Kazuki Endoh, Yoshiyasu Kawasaki and Yuki Toji Page 1 of 1

It is certified that error appears in the above-identified patent and that said Letters Patent is hereby corrected as shown below:

In the Claims

In Column 30, Line 62 in Claim 5, the phrase "The sheet" should read -- The steel sheet --.

In Column 30, Line 66, in Claim 7, after "manufacturing" the phrase "a high strength" should be deleted.

Signed and Sealed this
Tenth Day of June, 2025

Coke Morgan Stewart
*Acting Director of the United States Patent and Trademark Office*